United States Patent [19]

Inoue et al.

[11] Patent Number: 5,334,879
[45] Date of Patent: Aug. 2, 1994

[54] FEEDING SYSTEM AND FEEDING METHOD FOR A SUBMARINE CABLE COMMUNICATION SYSTEM

[75] Inventors: Yoshiyuki Inoue; Masaaki Takahashi; Kenji Ohta, all of Kawasaki, Japan

[73] Assignee: Fujitsu Limited, Kawasaki, Japan

[21] Appl. No.: 92,563

[22] Filed: Jul. 16, 1993

Related U.S. Application Data

[63] Continuation of Ser. No. 822,103, Jan. 17, 1992, abandoned.

[30] Foreign Application Priority Data

Jan. 17, 1991 [JP] Japan ................. 3-015672
Feb. 7, 1991 [JP] Japan ................. 3-038173

[51] Int. Cl.⁵ ............... H01H 47/14; H04B 3/02
[52] U.S. Cl. ......................... 307/112; 333/105;
    307/100; 361/62; 361/166; 361/191
[58] Field of Search ............ 307/112, 29, 38, 39,
    307/41, 100, 131; 361/116, 167, 191, 170,
    62-68; 370/13, 13.1, 14, 16; 455/8; 333/100,
    101, 105; 379/2, 296, 26, 348, 175

[56] References Cited

U.S. PATENT DOCUMENTS

| | | | |
|---|---|---|---|
| 3,644,787 | 2/1972 | Hamilton | 307/100 |
| 4,641,372 | 2/1987 | Kelly et al. | 370/16 |
| 4,798,969 | 1/1989 | Inoue et al. | 307/112 |
| 5,196,984 | 3/1993 | Webb | 361/191 |

FOREIGN PATENT DOCUMENTS

| | | | |
|---|---|---|---|
| 61-105131 | 5/1986 | Japan | H04B 3/36 |
| 63-5630 | 1/1988 | Japan | H04B 3/44 |
| 63-246042 | 10/1988 | Japan | H04B 9/00 |
| 1192230 | 8/1989 | Japan | H04B 3/44 |
| 1220531 | 9/1989 | Japan | H04B 3/44 |
| 1243734 | 9/1989 | Japan | H04B 8/44 |

*Primary Examiner*—A. D. Pellinen
*Assistant Examiner*—Richard T. Elms
*Attorney, Agent, or Firm*—Staas & Halsey

[57] ABSTRACT

A feeding system is provided for supplying a current to repeaters on a communication cable including a feed line for conducting a current to the repeaters. The feeding system includes a plurality of branching units provided on the communication cable and terminal stations each being connected through at least one of the repeaters to one of the branching units, and each of the terminal stations feeding a current through the feed line to the repeaters. In addition each of the plurality of branching units includes at least one switching circuit for switching to connect the at least one of the repeaters to the communication cable or to the ground, depending on the amount of current conducting through the feed line in the communication cable. Further, the current thresholds of the switching circuits in the plurality of branching units are preferably different from each other.

18 Claims, 25 Drawing Sheets

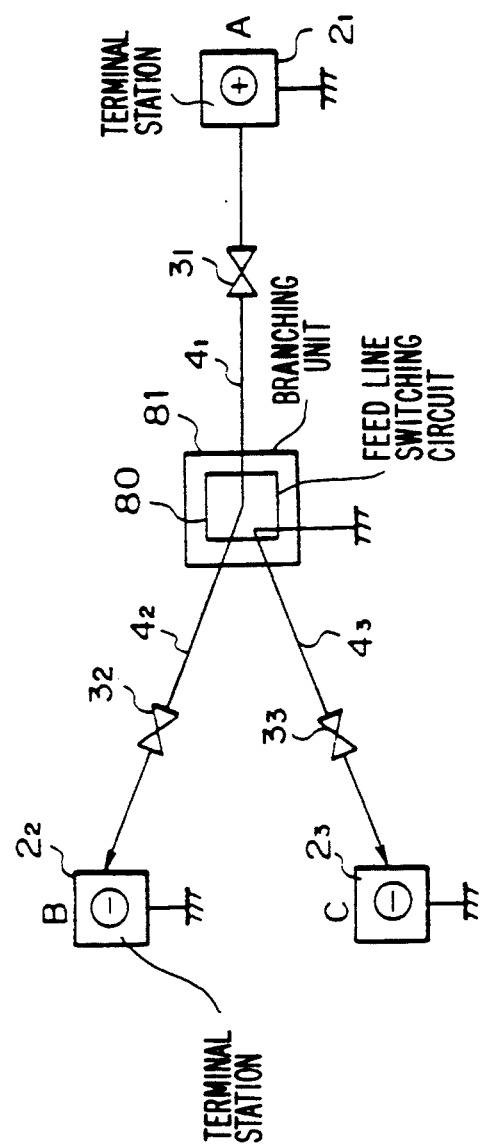

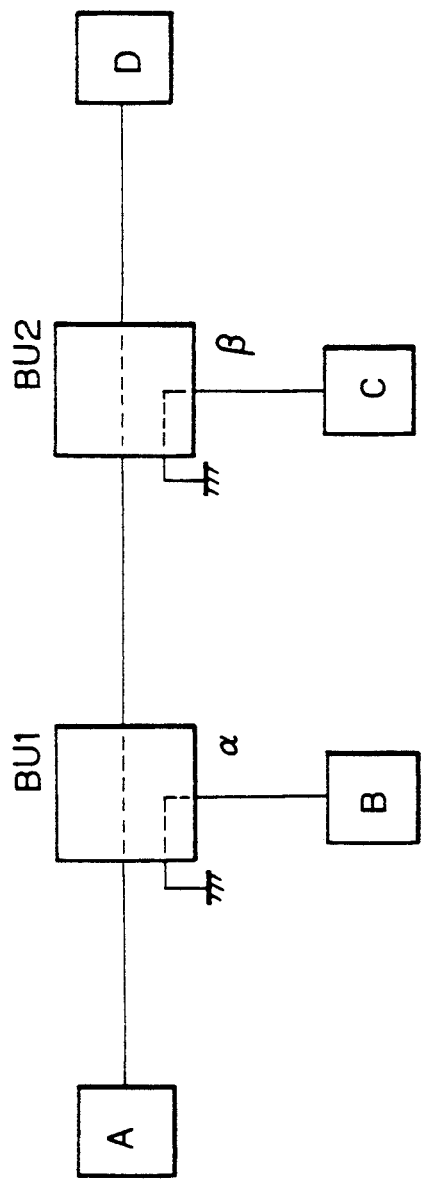
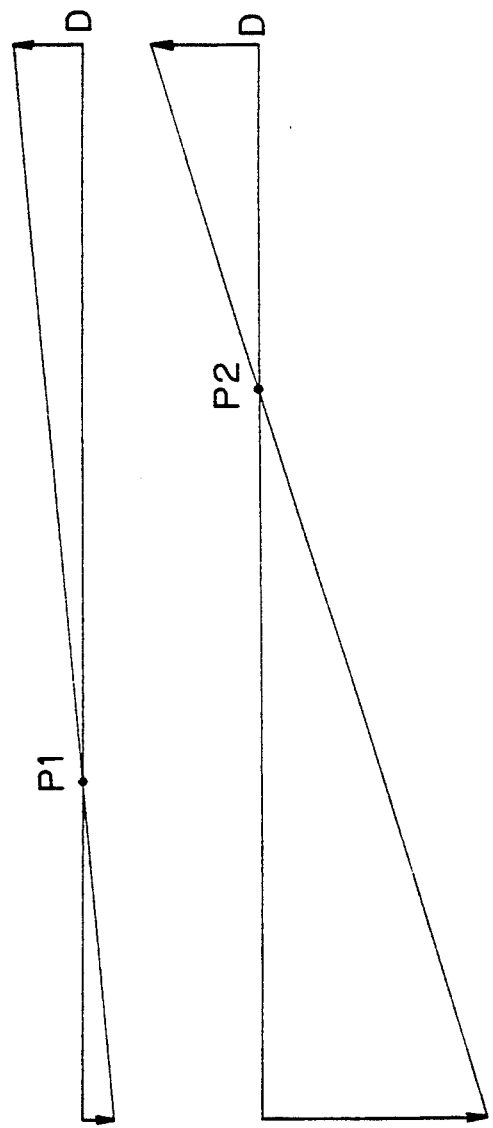
Fig. 13A
Fig. 13B
Fig. 13C

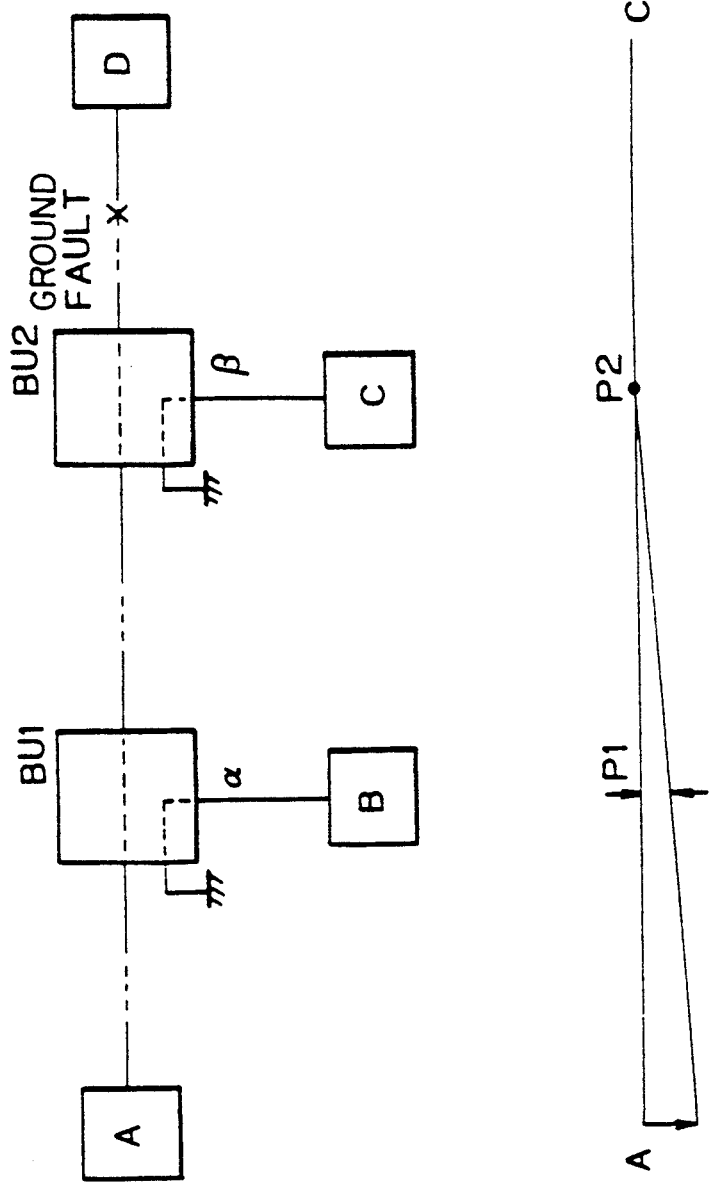

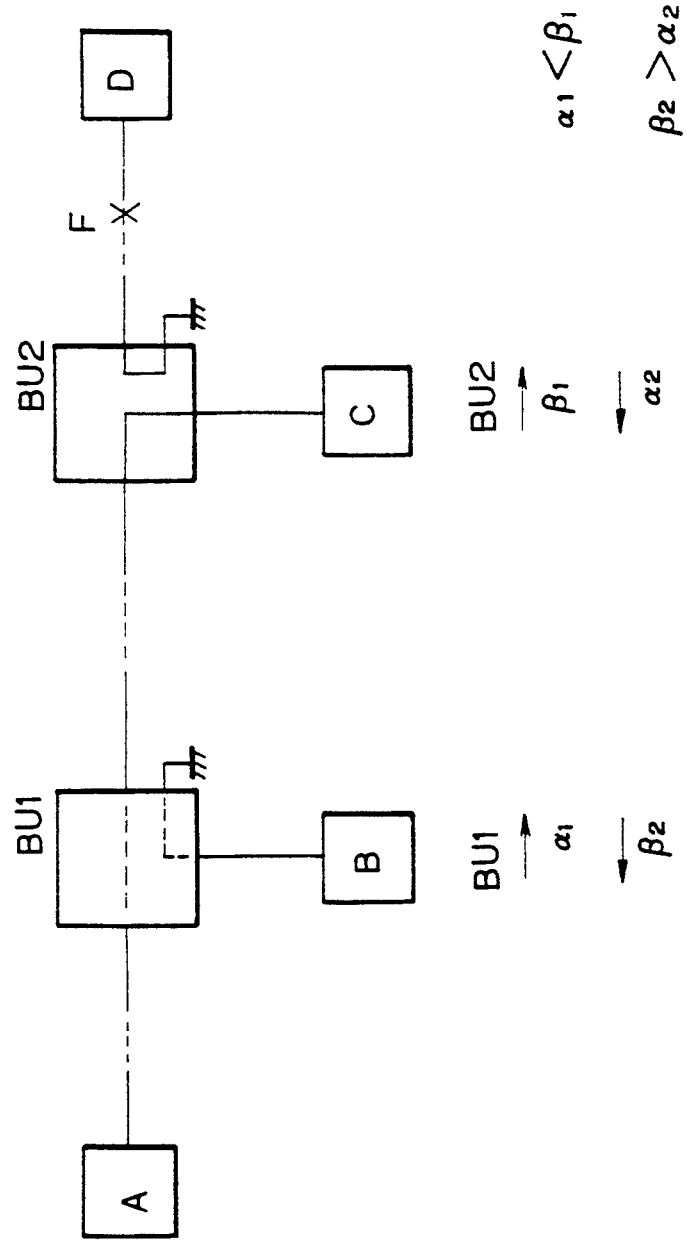

X: FAULT POINT

FEEDING SYSTEM AND FEEDING METHOD FOR A SUBMARINE CABLE COMMUNICATION SYSTEM

This application is a continuation of application Ser. No. 07/822,103, filed Jan. 17, 1992, now abandoned.

BACKGROUND OF THE INVENTION (1) Field of the Invention

The present invention relates to, for example, a feeding system and method used for a submarine cable communication system, for effecting communication among multi-points by using submarine cables such as optical submarine communication cables, and in particular, relates to a feeding system and method used for communication cables having feed lines, for supplying currents to a plurality of repeaters provided at every predetermined distance on the communication cables for branching and connecting at least three terminal stations.

(2) Description of the Related Art

Conventionally, only a single submarine branching unit is provided in a transmission system utilizing optical submarine communication cables for connecting at least three cable landing stations through repeaters.

Recently, however, the need to provide a system in which a plurality of branching units are provided in one communication system to effect communication among an increased number of cable landing stations has increased.

Accordingly, the present invention has an object to provide a feeding system and method for communication cables that can control a plurality of branching units in one communication system, where it is possible to accommodate a communication system and able to communicate among a large number and a wide range of stations, and where the communication system is highly efficient, is very convenient, and has a developing or expanding potential and a complex communication network.

SUMMARY OF THE INVENTION

To attain the above object, there is provided, according to the present invention, a feeding system for supplying a current to repeaters on a communication cable. The communication cable includes a feed line for conducting or transmitting a feed current to the repeaters. The system comprises a plurality of branching units provided at a plurality of branching points on the communication cable, and a plurality of terminal stations each connected through at least one of the repeaters to one of the branching units. Each of the terminal stations feeds a current through the feed line to the corresponding single or multiple repeaters.

Each of the plurality of branching units has at least one switching circuit for connecting at least one of the repeaters to the communication cable or to the ground, depending on the amount of current passing through the feed line in the communication cable. The current thresholds of the switching circuits in the plurality of branching units are different from each other.

According to one aspect of the present invention, the switching circuit comprises a first current branching circuit, connected in parallel with a driving circuit for conducting or transmitting an operating current to drive the switching circuit, for conducting a first current in one direction only, and a second current branching circuit, connected in parallel with the driving circuit, for conducting, in a direction opposite to the direction of the current through the first current branching circuit, and for conducting a second current different from the first current.

According to still another aspect of the present invention, there is provided a feeding method in a feeding system as mentioned above, in which when a switching instruction is to be given to a plurality of branching units, currents having values over the current thresholds are sequentially supplied in order from a smaller current threshold; and when an instruction to return the switching is to be given, currents having values over the current thresholds are sequentially supplied in order from a larger current threshold.

According to still another aspect of the present invention, in the method as described above, each of the switching circuits has operating currents depending on the current direction. The feed line switching circuits in the respective branching units are constructed so as to have different operating currents for the same feed current direction in a both-end feed line to be set. At system start up after a fault has occurred, between a non-fault line side station at the side of a fault side branching unit and a station at a non-fault side branching unit, a current is supplied with a feeding current direction for operating the switching circuit in the fault-side branching unit by a smaller operating current so that the feed line is switched to disconnect the fault line, and then a larger feeding current is supplied in the same direction so that the switching circuit in the no-fault side branching unit is switched to set a feed line.

BRIEF DESCRIPTION OF THE DRAWINGS

The above object and features of the present invention will be more apparent from the following description of the preferred embodiments with reference to the accompanying drawings, wherein:

FIG. 10 is a diagram showing a feed line (normal state) of a total communication system in a conventional example;

FIGS. 13A to 13C are diagrams for explaining the method of a feed line switching in a submarine cable communication system including two branching units according to an embodiment of the present invention;

FIGS. 14A and 14B are diagrams for explaining problems in the system shown in FIG. 13A;

FIG. 15 is a diagram for explaining the principle according to another aspect of the present invention;

DESCRIPTION OF THE PREFERRED EMBODIMENTS

For a better understanding of the present invention, a conventional system is first described with reference to FIGS. 10 to 12B. In FIG. 10, a conventional transmission system includes only a single submarine branching unit 81 which is connected through optical submarine repeaters $3_1$, $3_2$, and $3_3$ provided at every predetermined distance on the optical submarine cables, by means of optical submarine communication cables, to three cable landing stations $2_1$, $2_2$, and $2_3$ provided on the land, respectively. Between the cable landing stations $2_1$, $2_2$, and $2_3$, a communication is effected. The optical submarine cables include feed lines $4_1$, $4_2$, and $4_3$, respectively, for supplying power from the cable landing stations $2_1$, $2_2$, and $2_3$ to the optical submarine repeaters $3_1$, $3_2$, and $3_3$. The submarine branching unit 81 has a switching circuit 80 for switching, when a fault occurs on or in one of the optical submarine communication cables among the feed lines $4_1$, $4_2$, and $4_3$ so as to continue communication through communication cables which have not experienced a fault. The switching in the switching circuit 80 is effected by controlling a feeding current and voltage from the cable landing stations. The optical submarine repeaters $3_1$, $3_2$, and $3_3$ compensate for a reduction in the power of optical communication signals by receiving power from the cable landing stations $2_1$, $2_2$, and $2_2$, respectively.

When a fault occurs on one of the optical submarine communication cables, it is not necessary to supply power to a repeater provided on the optical submarine communication cable on which the fault has occurred. Therefore, the submarine branching unit 81 has to switch to ground the faulty feed line connected to the repeater in question.

Figure 11A:
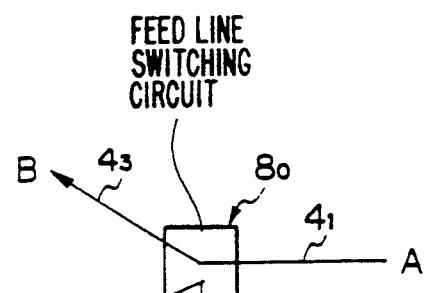
FIGS. 11A–11C are diagrams showing the status of a switching during fault in a conventional example.
Figure 11B:
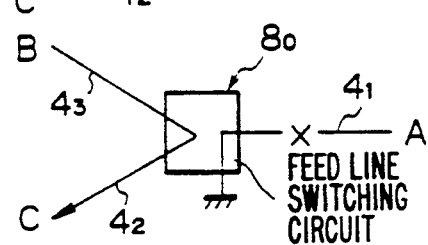
Figure 11C:
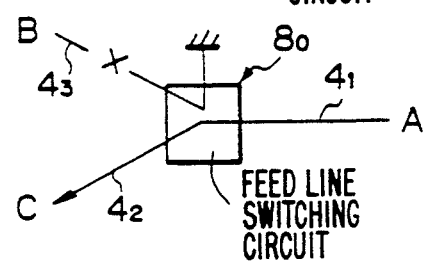

For example, when a fault occurs on the optical communication cable between the submarine branching unit 81 and the cable landing station C2$_3$, the feed line $4_3$ connected to the repeater $3_3$ is switched to be grounded as shown in FIG. 11A; when a fault occurs on the optical communication cable between the submarine branching unit 81 and the cable landing station A2$_1$, the feed line $4_1$ is switched to be grounded as shown in FIG. 11B; and when a fault occurs on the optical communication cable between the submarine branching unit 81 and the cable landing station B2$_2$, the feed line $4_2$ is switched to be grounded as shown in FIG. 11C.

To switch the switching circuit 80, a predetermined current is supplied to the switching circuit 80. The predetermined current is the threshold current of the switching circuit 80. The threshold current is previously determined during the manufacturing process.

The switching circuit 80 is constituted by a relay having contacts. Therefore, in the switching operation, it is necessary to avoid stress on the feed line switching circuit 80 in the branching unit 81 due to an arc discharge because of a potential difference of the contacts between the pre-switching and the after-switching. To this end, the contacts in the branching circuit 81 which is to be switched are made to be zero potential with respect to the ground.

Figure 12A:
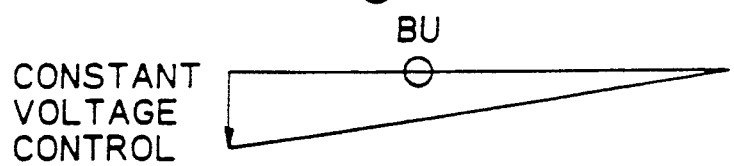
FIGS. 12A-12B are diagrams showing a voltage distribution when a feed line is switched in a branching unit in a conventional example.
Figure 12B:
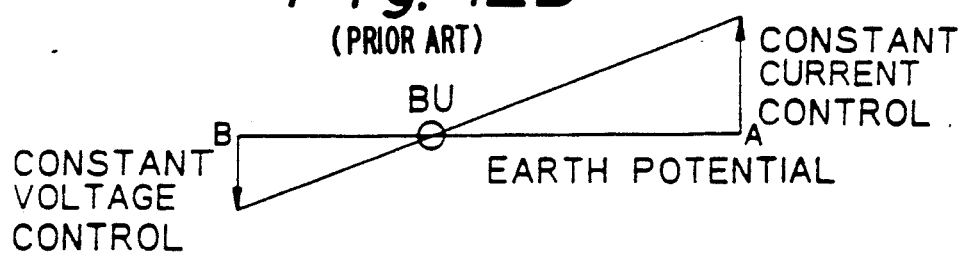

To make the voltage across the contacts of the relay to be zero, the voltage and current controls are effected as shown in FIGS. 12A and 12B in which two cable landing stations A and B and a branching unit BU are shown. To effect a switching operation in the branching unit BU, first, as shown in FIG. 12A, at the station B, a constant voltage V is applied between the station B and the station A. The value of the voltage V is the predetermined voltage between the station B and the branching unit BU when the predetermined threshold current is conducted through the branching unit BU at the time when the potential at the branching unit BU becomes zero with respect to the ground. Then, as shown in FIG. 12B, at the station A, a current is increased until the potential at the branching unit BU becomes zero with respect to the ground, while the voltage V at the station B is kept constant. When the potential at the branching unit BU becomes zero with respect to the ground, the predetermined threshold current I flows through the branching unit BU so that the switching is effected in the switching circuit.

Namely, one cable landing station B controls the voltage value of the feed line switching circuit in the branching unit to be 0 V by changing the voltage value while the current value is made constant by means of a constant current control, and then the cable landing station A performs the switching by flowing a current having a current value necessary for the switching of the corresponding feed switching circuit 80, such as a relay, by changing the current value while the voltage value is made constant.

On the other hand, recently, a requirement to provide a system in which a plurality of branching units are provided in one communication system to effect communication among an increased number of cable landing stations has increased.

The object of the present invention is to satisfy the above requirement.

Now, embodiments of the present invention are described in detail with reference to the drawings.

Figure 1:
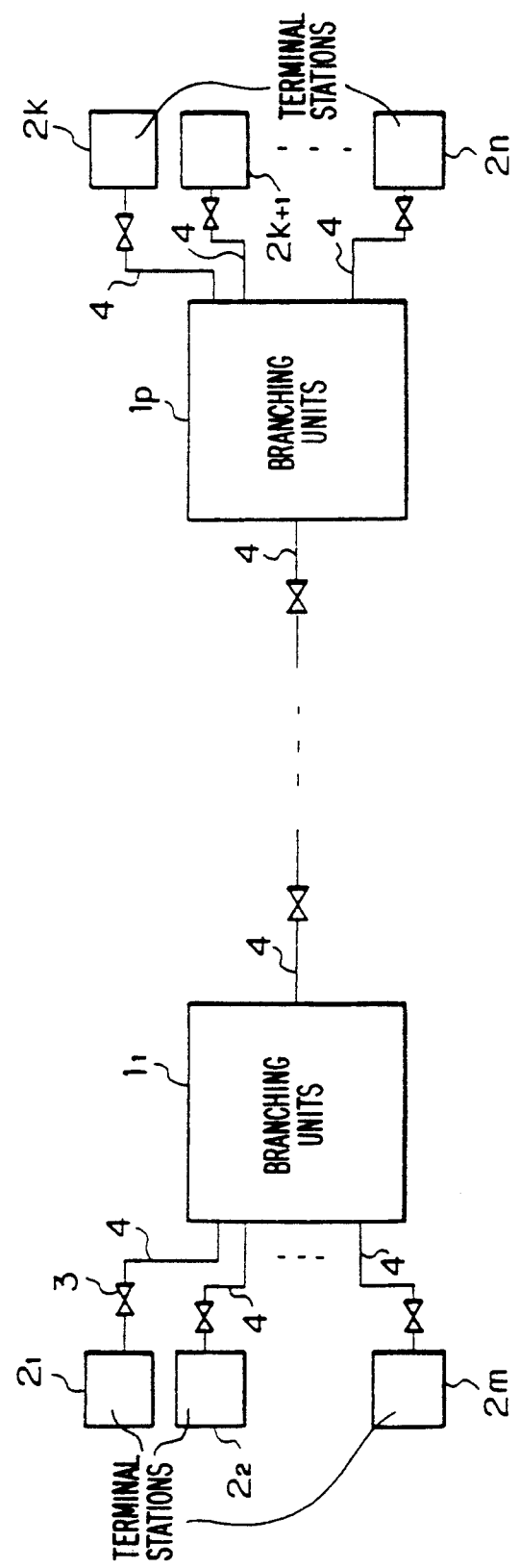
FIG. 1 is a principal block diagram of the first invention.

FIG. 1 is a principal diagram of a first embodiment of the present invention. In the figure, a feeding system for communication according to an embodiment of the present invention is shown. The feeding system is for supplying a current to repeaters 3 on a communication cable. The communication cable includes a feed line 4 for conducting a feed current to the repeaters 3. The feeding system comprises a plurality of branching units $1_j$, where $j=1, 2, \ldots P$, provided at a plurality of branching points on the communication cable, and a plurality of terminal stations $2_i$, where $i=1, 2, \ldots N$. Each of the terminal stations is connected through at least one of the repeaters 3 to one of the branching units $1_j$. Each of the terminal stations feeds a current through the feed line to the at least one of the repeaters 3.

Each of the plurality of branching units $1_j$, $j=1, 2, \ldots P$, has at least one switching circuit for switching to connect the at least one of the repeaters to the communication cable or to the ground, depending on the amount of current flowing through the feed line in the communication cable.

The current thresholds of the switching circuits in the plurality of branching units are different from each other.

Figure 2:
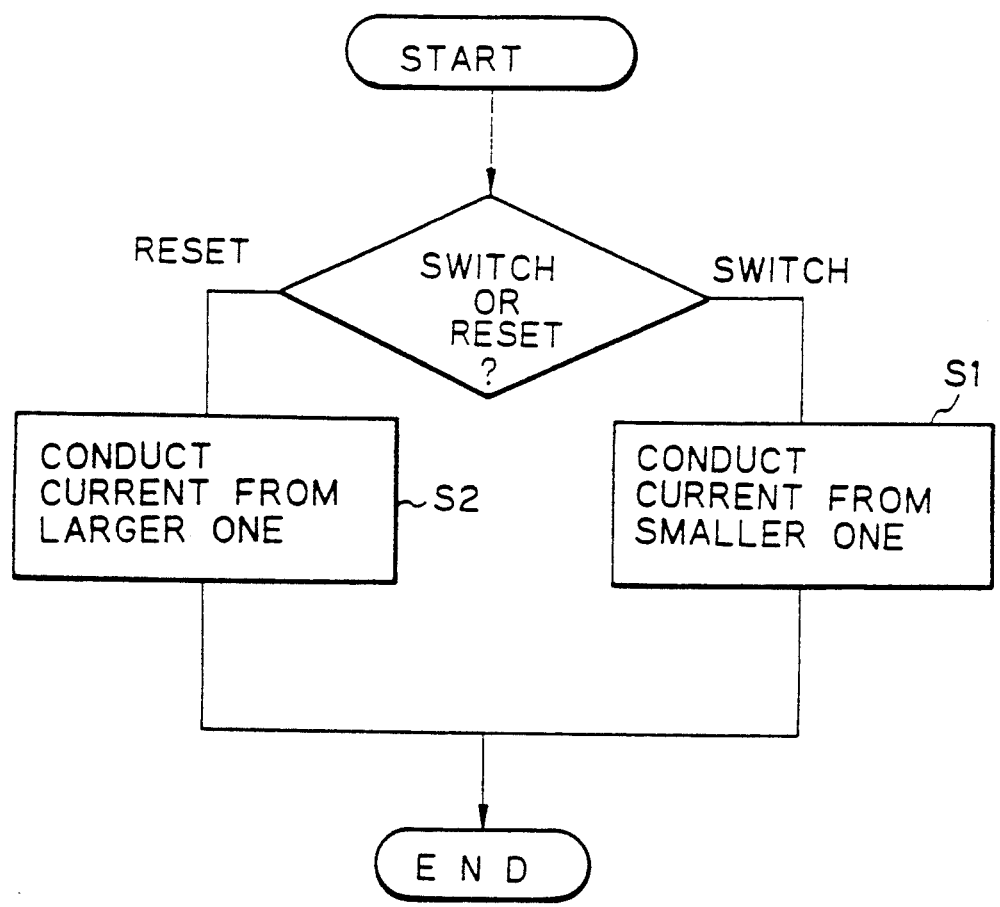
FIG. 2 is a flow chart explaining a feeding method of the present invention.

FIG. 2 is a flow chart explaining a feeding method of the present invention. In the figure, the feeding method is carried out by using the system shown in FIG. 1. When a switching instruction is given to a plurality of branching units each having at least one switching circuit, at step S1, the switching circuits having different switching current thresholds depending on the currents flowing through the feed lines, and currents having values over the current threshold values are sequentially supplied from a smaller current threshold, and when an instruction to reset the switching is given in step S1, at step S2, currents having values over the current threshold values are sequentially supplied from a larger current threshold.

In the following, the mode of operation in the first and the second embodiments of the present invention are explained.

When a feed line 4 is to be switched because of a fault on the feed line 4 or at any point on the communication line, at step S1, among the different current thresholds of the switching circuits to be switched, and where the branching circuits each have at least one switching circuit, the currents having values more than the threshold values are sequentially supplied in order from the smaller current threshold.

By controlling a voltage at a terminal station, the potential at the branching unit in which the switching is to be effected is set to zero with respect to the ground, and then by conducting a current having a value greater than the current threshold of the switching circuit in question, the switching circuit in the branching unit is switched. Thus, by increasing the conducting current, the branching units are sequentially switched without applying stress on each switching circuit.

When the switching is reset, at step S2, currents having values greater than the different threshold values of the switching circuits in the respective branching units $1_j$ are conducted in sequence from the larger current.

At this time also, in the same way as in the above-mentioned switching operation, by controlling a voltage at a terminal station, with respect to the branching unit in which the switching is to be effected, the voltage with respect to the ground is set to zero, and then by conducting a current having a value more than the threshold value, the branching units are sequentially switched so that it is possible to reset the switching without applying stress on each switching circuit.

Figure 3:
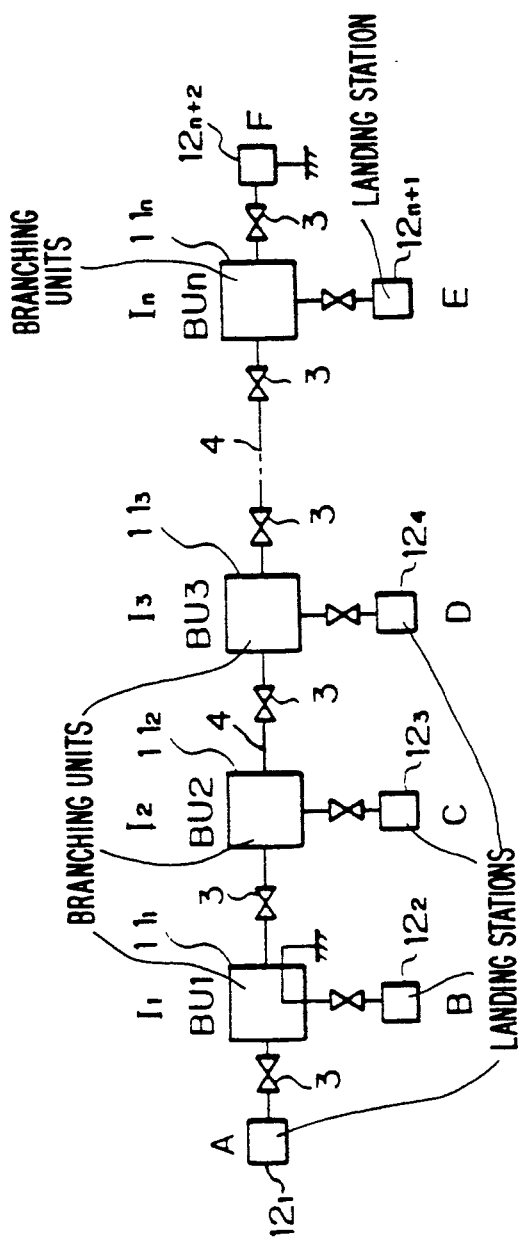
FIG. 3 is a diagram showing a feed line of a total communication system according to an embodiment of the present invention.

FIG. 3 shows a detailed block diagram according to to the first and second embodiments of the present invention.

As shown in the figure, in the feeding system and method for communication cables, there are provided cable landing stations $12_i$ $i=1,2, \ldots, n+2$, which are a plurality of terminal stations, a plurality of repeaters 3 provided at every predetermined distance on the optical communication cables, which are communication cables for branching and connecting among the cable landing stations, feed lines 4 provided for supplying currents to the repeaters, and a plurality of branching units $11_k$, where $k=1, 2, \ldots, n$, provided at respective branching points on the feed lines, each having two switching circuits having different current thresholds for switching currents flowing through the feed lines.

Also, the current thresholds for example $I_k$ and $I_m$ ($k \approx m$) m) of the switching circuits provided in the different branching units are different, and the current threshold $I_k$ is set to be larger along with the increase of the number k ($I_1<I_2<I_3< \ldots I_n$), and the current thresholds for switching in the two switching circuits in the same branching unit are set to be the same value $I_k$. Even the maximum current threshold $I_n$ of several hundreds miliampere is smaller than the normal feeding current of 1.6 A.

Figure 4:
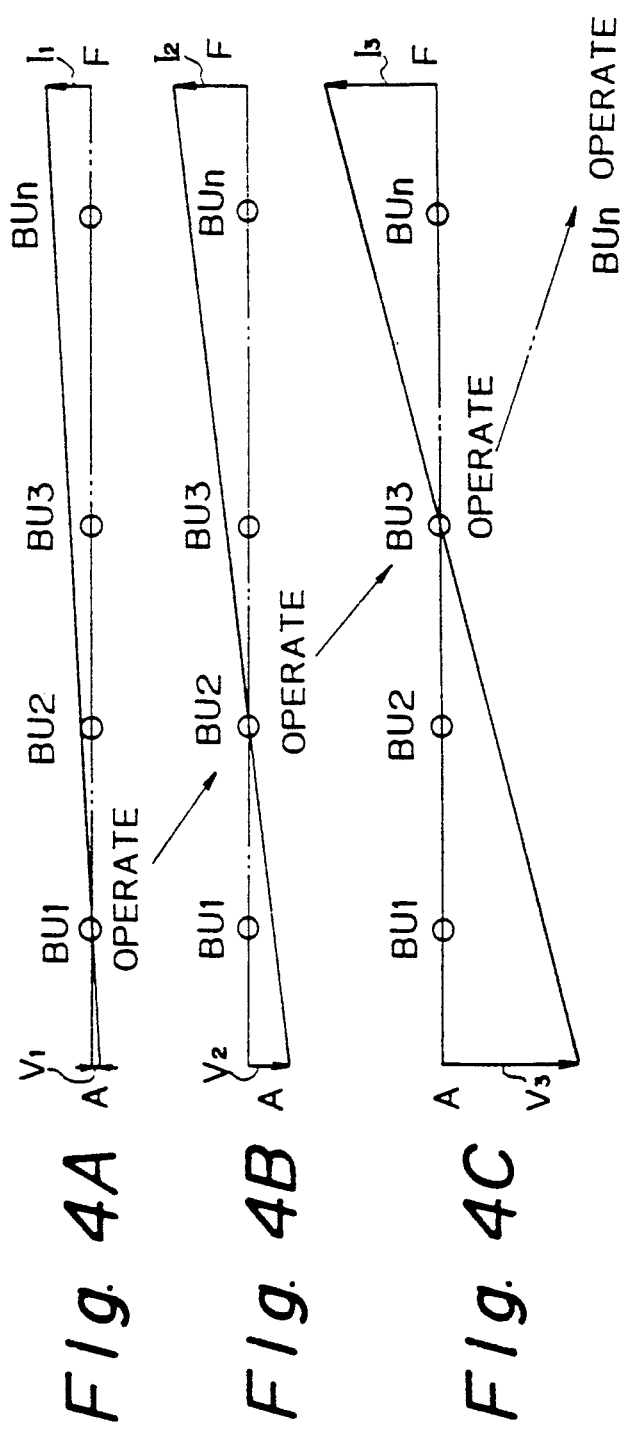
FIGS. 4A to 4C are explanatory diagrams of a switching of the feed line of the communication system according to an embodiment of the present invention.

FIGS. 4A to 4C are diagrams explaining the sequence of the switching according to the above-described embodiments of the present invention.

As shown in FIG. 4A, a terminal station A applies a voltage $V_1$ between the terminal stations A and F. The voltage $V_1$ is the predetermined voltage between the terminal station A and the branching unit BU1 when the branching unit BU1 is switching. Then, the terminal station F supplies a current $I_1$ to the feed line while the voltage $V_1$ at the terminal station A is kept constant. The value of the current $I_1$ is the current threshold of the branching unit BU1. Thus, a switching is effected in the branching unit BU1.

Then, as shown in FIG. 4B, the terminal station A applies a voltage $V_2$ between the terminal stations A and F while a current from the terminal station F is kept at $I_1$. The voltage $V_2$ is the predetermined voltage between the terminal station A and the branching unit BU2 when the branching unit BU2 is switching. Then, the terminal station F supplies a current $I_2$ larger than $I_1$ to the feed line while the voltage $V_2$ at the terminal station A is kept constant. The value of the current $I_2$ is the current threshold of the branching unit BU2. Thus, a switching is effected in the branching unit BU2.

Similarly, by the constant voltage control and the constant current control, the branching unit BU3 switches. The branching units followed by the branching units BU3 also operate sequentially to switch.

FIGS. 5, 6, 7, and 8 are diagrams for explaining the switching operations in the branching units BU1, BU2, and BU3. To make the explanation simple, as shown in FIG. 5, FIG. 6, FIG. 7, and FIG. 8, there is a limitation of three branching units $11_1$, $11_2$, and $11_3$ and a limitation of five cable landing stations $12_1$, $12_2$, $12_3$, $12_4$, and $12_5$.

In FIGS. 5 to 8, there are two switching circuits 5 and 6, 7 and 8, or 9 and 10 in each branching circuit $11_1$, $11_2$, or $11_3$. These switching circuits are relays. Each switching circuit has coils K1 and K2, K3 and K4, or K5 and K6 and switches k1 and k2, k3 and k4, or k5 and k6, which are opened or closed by the corresponding coils. In the branching unit $11_1$, the coil K1 and the switch k2 which does not correspond to the coil K1 and is connected to the cable lancing station $12_1$, are connected in series, and the coil K2 and the switch k1 which does not correspond to the coil K2 and is connected to the cable landing station $12_2$, are connected in series. Similarly, in each switching circuit 7, 8, 9, or 10, on the feed line leading to the corresponding cable landing station, the coil for the relay and the switch which does not correspond to the coil are connected in series. The current threshold of the coils for switching the switching circuits provided in the same branching units is set to be the same such as $(K_1, K_2)=I_1$, $(K_3, K_4)=I_2$, or $(K_5, K_6)=I_3$. The current thresholds $I_1$, $I_2$, and $I_3$ for switching among the different branching units are set to be different from each other, and are set to be in the order of $I_1<I_2<I_3$.

Next, the operation according to to the embodiment of the present invention is described. In this embodiment, a description is provided for the case when a switching is effected in such a way as to connect the feed line between the cable landing station $A12_1$ and the cable landing station $E12_5$, disconnect the other cable landing stations $12_2$ to $12_4$ from the feed line and connect them to the ground.

Figure 5:
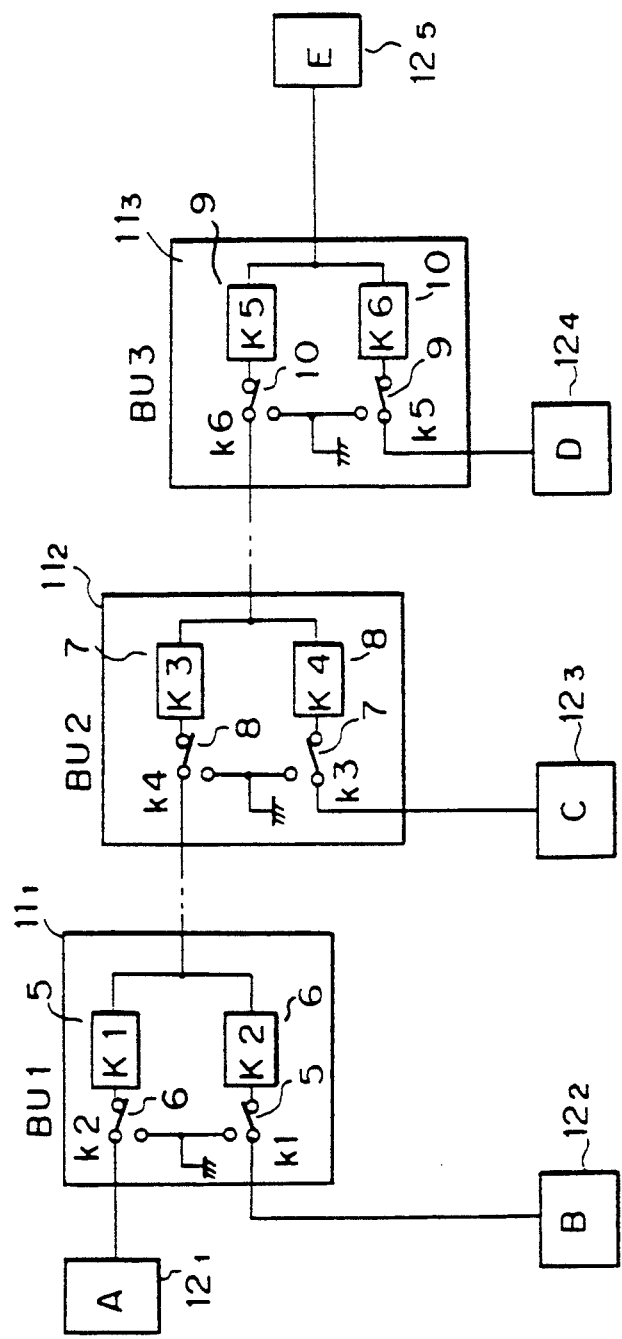
FIG. 5 is a diagram showing the status of a switching when no power is supplied according to an embodiment of the present invention.

FIG. 5 shows the state before the switching operation. In this state, all of the cable landing stations $A12_1$ to $E12_5$ are connected to the corresponding branching units $11_1$, $11_2$, and $11_3$, but no power is supplied to each repeater. Namely, although the switching circuits $5(K_1, k_1)$, $6(K_2, k_2)$, $7(k_3, k_3)$, $8(K_4, k_4)$, $9(K_5, k_5)$, and $10 (K_6, k_6)$ provided in each branching unit $11_1$, $11_2$, and $11_3$ are in the state to connect the corresponding cable landing stations to the branching units, power is not supplied from each cable landing station to the feed line.

Figure 6A:
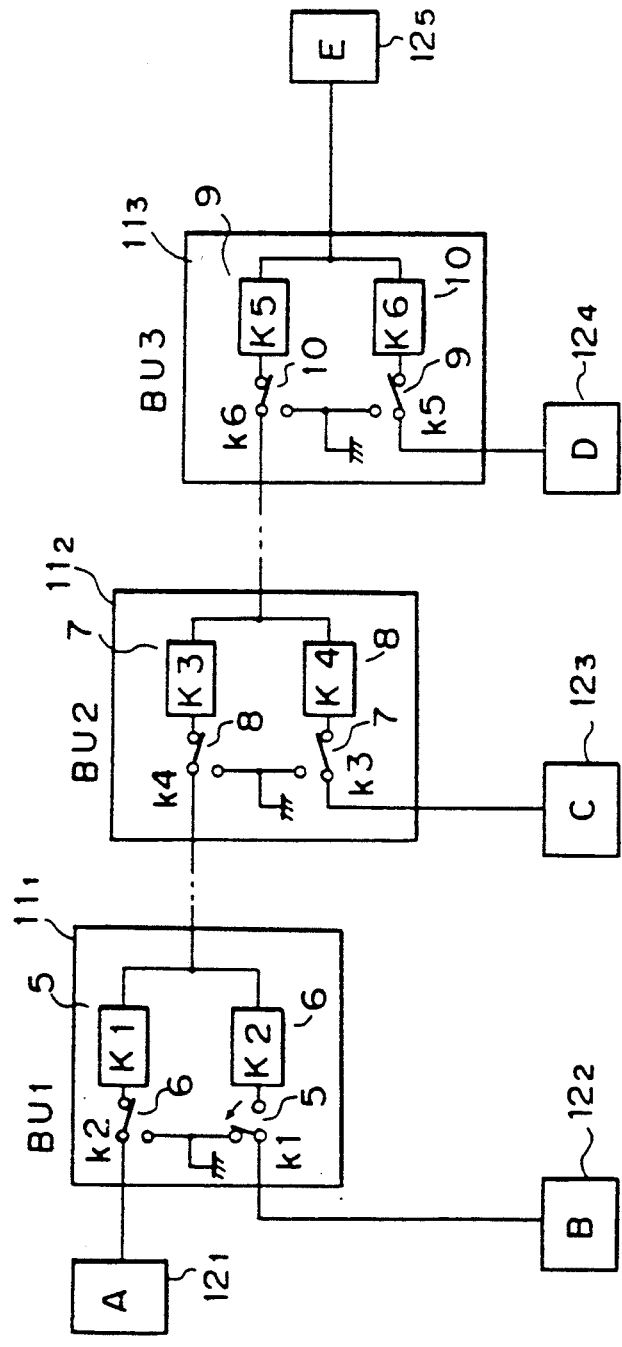
FIGS. 6A and 6B are explanatory diagrams of a switching of a first branching unit according to an embodiment of the present invention.
Figure 6B:
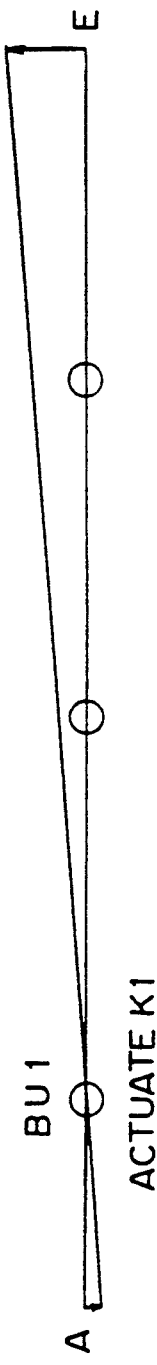

To effect a switching to disconnect the cable landing stations $B12_2$, $C12_3$, and $D12_4$ from the feed lines and to connect it to the ground, the cable landing stations $B12_2$, $C12_3$, and $D12_4$ are disconnected from the corresponding feed lines before the switching operation so that the coils K2, K4, and K6 are not energized during the switching. This disconnection is effected in each of the cable landing stations $B12_2$, $C12_3$, and $D12_4$. Then, as shown in FIG. 6A, the switching is effected first from the switching circuit having the smallest current threshold $I_1$, namely from the branching unit $11_1$. At this time, as shown in FIG. 6B, by means of the constant voltage control and the constant current control as mentioned before by the cable landing station $A12_1$ and the cable landing station $E1_5$, respectively, the potential at the branching unit $11_1$ is set to zero potential, which is the same as the ground potential, so that a current having a current value exceeding the current threshold $I_1$ of the branching unit $11_1$ but not exceeding the current threshold $I_2$ of the next branching unit $11_2$, is conducted on the feed line 4 connected between the cable landing station $A12_1$ and the cable landing station $E12_5$, whereby a magnetic force is generated from the coil K1 in the switching circuit 5 in the branching unit $11_1$, so that the switch k1 is opened by attracting one end of the switch k1 by means of the magnetic force to the feed line of the ground side, thus the switching is performed as shown in FIG. 6A. In this way, the cable landing station $B12_2$ is grounded without operating the other switching circuits.

Figure 7A:
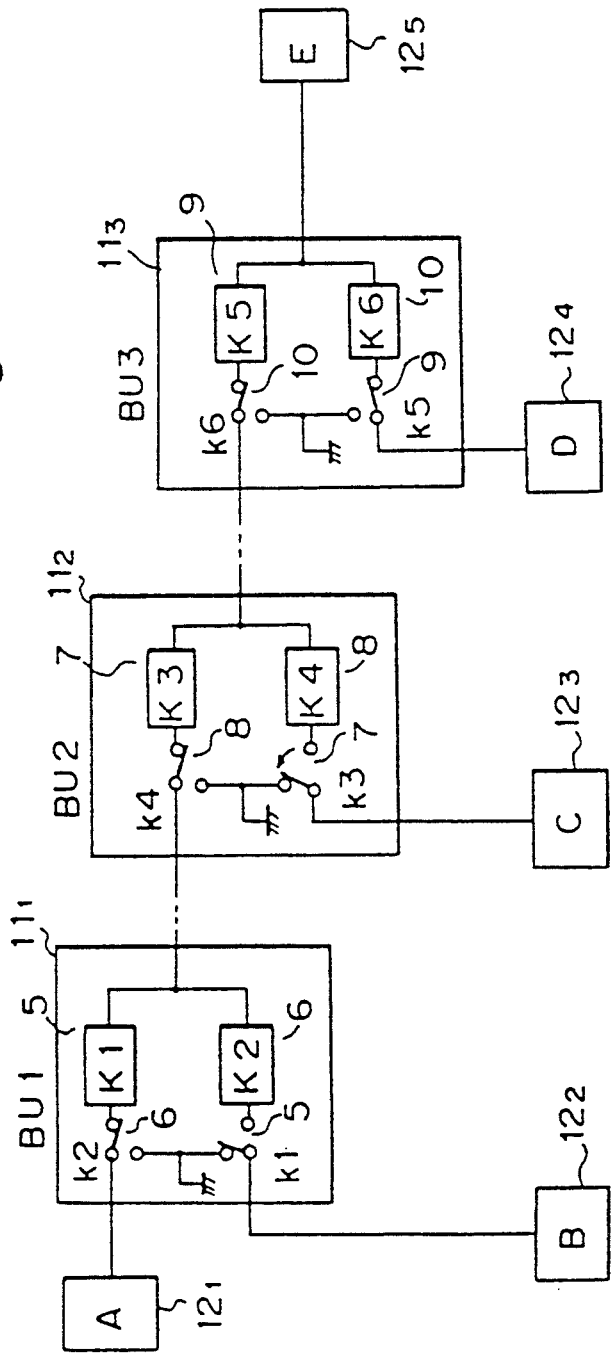
FIGS. 7A and 7B are explanatory diagrams of a switching of a second branching unit according to an embodiment of the present invention.

Next, as shown in FIG. 7A, the branching unit $11_2$ is switched. In the branching unit $11_2$, the current threshold $I_2$ which is the next lower current threshold is set.

Figure 7B:
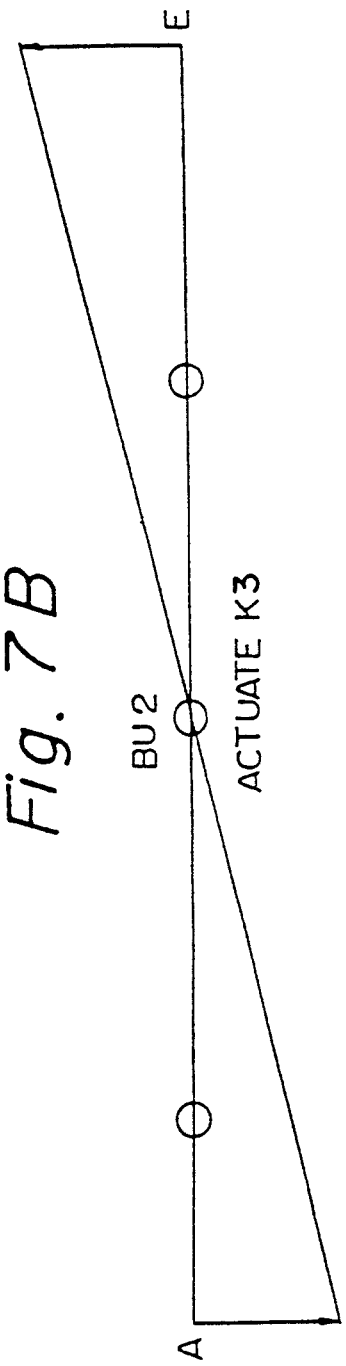

At this time, as shown in FIG. 7B, the potential at the branching unit $11_2$ is set to zero voltage, which is the same as the ground potential, so that a current having a current value exceeding the current threshold $I_2$ of the branching unit $11_2$, but not exceeding the current threshold $I_3$ of the next branching unit $11_3$, is conducted on the feed line 4 connected between the cable landing station $A12_1$ and the cable landing station $E12_5$, whereby the switching circuit 7 in the branching unit $11_2$ is switched so that the cable landing station $C12_3$ is grounded without operating the other switching circuits. Namely, in the branching unit $11_1$, since the switch k1 provided on the feed line connected to the cable landing station $B12_2$ which has been already switched has been opened, the switch k2 provided on the feed line connected to the cable landing station $A12_1$ is not influenced by the coil K2 even when there is a potential difference between the contact of the switch k2 and the ground; and in the branching unit $11_3$, the current value does not reach the current threshold $I_3$ of the switching circuit so that the switching circuit 9 is not influenced by the current $I_3$.

Figure 8A:
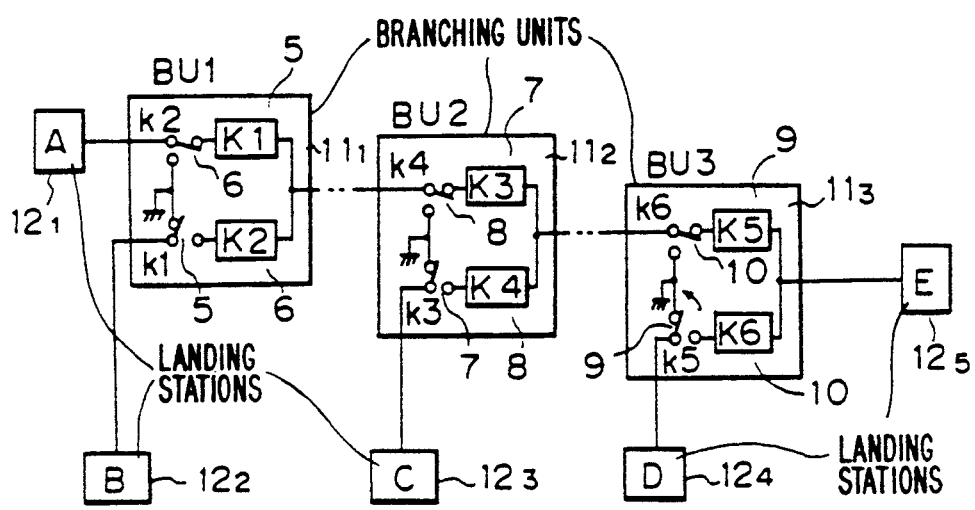
FIGS. 8A and 8B are explanatory diagrams of a switching of a third branching unit according to an embodiment of the present invention.

In a similar way, FIG. 8A shows the case of the switching of the switching circuits 9 ($K_5$, $k_5$) and 10 (K6, k6).

Figure 8B:
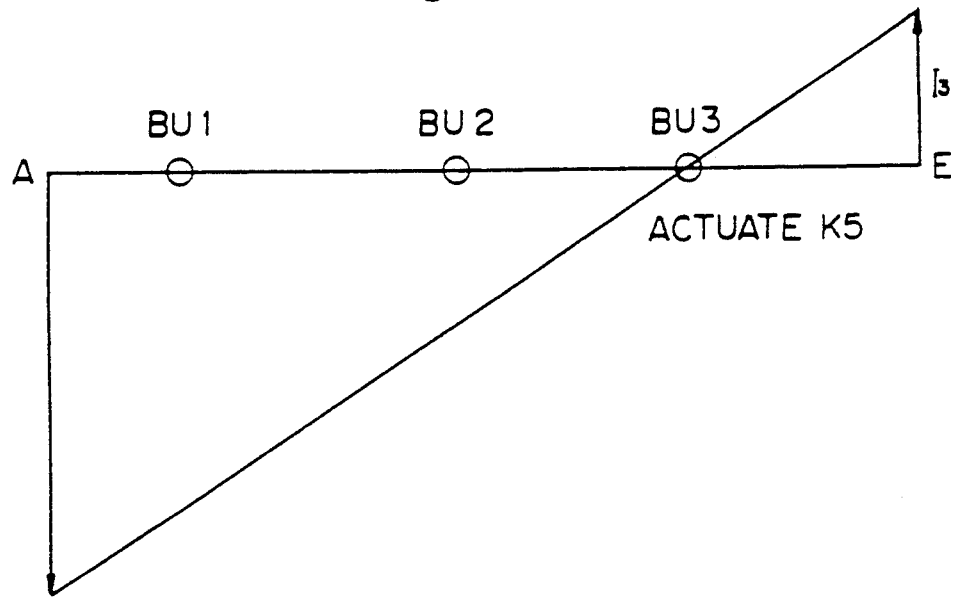
Figure 9A:
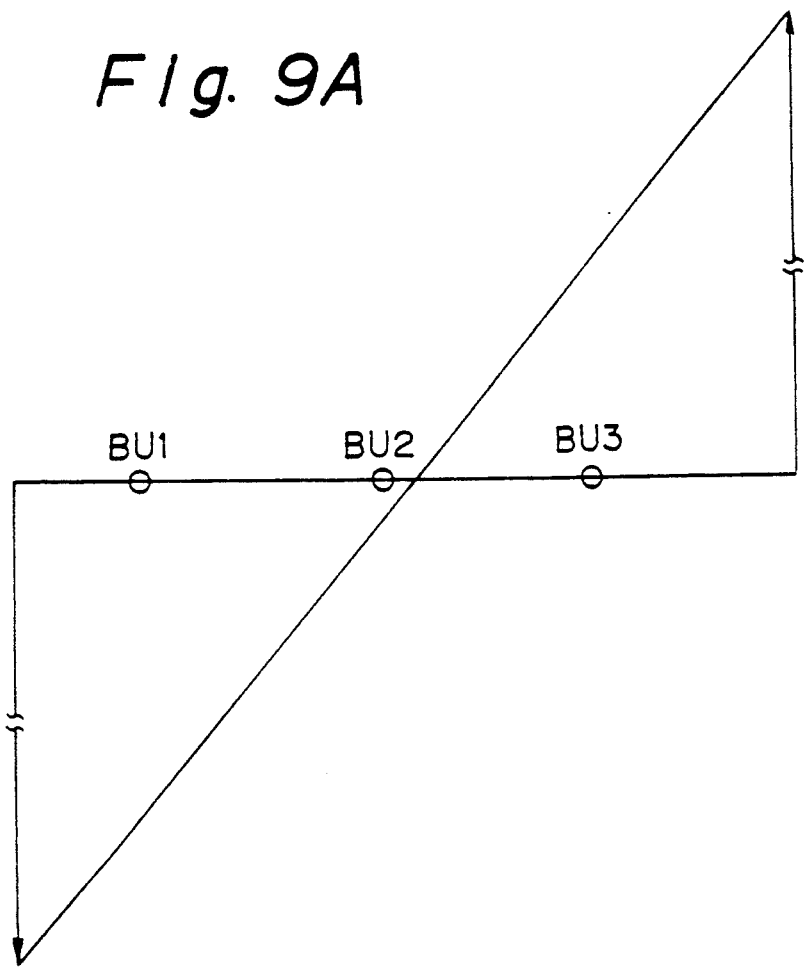
FIGS. 9A–9D are explanatory diagrams showing a normal operation state of the feed line according to to an embodiment of the present invention.
Figure 9B:
Figure 9C:
Figure 9D:

In this case, as shown in FIG. 8B, the potential at the branching unit 113 is set to zero voltage, which is the same as the ground potential, so that a current having a current value exceeding the current threshold $I_3$ of the branching unit $11_3$ is conducted on the feed line 4 connecting the cable landing station $A12_1$ and the cable landing station $E12_5$, whereby the switching circuit 9 in the branching unit $11_3$ is switched. At this time, since the other branching units have been switched, the flow of the current does not influence on the other branching units.

Thus, as shown in FIG. 7B and FIG. 8B, along with an increase of the current threshold, the potential difference set between the cable landing station $A12_1$ and the cable landing station $E12_5$ is increased, and accordingly, the current flowing through the feed line 4 (corresponding to the inclination of the slash line) is increased.

On the other hand, during a normal period of feeding, as shown in FIGS. 9A, 9B, 9C and 9D, by conducting a current larger than the above-mentioned current $I_3$ through the switched feed line between the cable landing station $A12_1$ and the cable landing station $E12_5$, power is supplied to each repeater connected between the stations. At this time, the voltage values at the cable landing station $A12_1$ and the cable landing station $E12_5$ are set the same. Also, to supply power to a repeater on the feed line connected to the other cable landing station $B12_2$, $C12_3$, or $D12_4$, as shown in the lower portion of the figure, the power feed is effected from the corresponding cable landing station by grounding or connecting submarine earth or the ocean floor to the branching unit.

The above explanation is more generally shown in FIGS. 4A, 4B, and 4C. As shown in the figures, along with an increase of the current threshold, the current value flowing through the feed line is also increased.

As described above, according to the embodiment of the present invention, since the switching circuits in the branching units are sequentially switched by setting the potential of the corresponding branching unit to the ground potential, the load on the switching circuit at the switching time is reduced, and the generation of a surge can be prevented.

Note that, in the above description, the current thresholds in the switching units in the same branching unit are set the same, however, they are not restricted to this case, but the current thresholds may be different in the switching circuits in the same branching unit. Also, although the current thresholds are set as $I_1 < I_2 < I_3 \ldots < I_n$, the order of the amount is not restricted to this case but may be arbitrary, for example, $I_1 > I_2 > I_3 \ldots I_n$. The only necessary limitation is that the current threshold in one branching unit must be different from the current threshold in another branching unit.

Still further, as the construction of each branching unit, the one shown in FIG. 5 to FIG. 8 was used, however, this is merely one example of an explanation of the principle.

As described above, according to the embodiment of the present invention, a plurality of branching units are provided on branching points on a feed line, each branching unit having at least one switching circuit which is switched depending on the current flowing through the feed line, the switching circuits having current thresholds different from each other.

Therefore, according to the above-described embodiment of the present invention, the switching of the plurality of branching units can be performed by a current control or a voltage control at each terminal station, whereby it is possible to accommodate with communication system capable of communicating among a large number and wide range of stations, is highly efficient in use, very convenient, and has a developing and complex communication network.

The above-described embodiment of the present invention, however, has a disadvantage when the switching sequence is opposite to the above-described embodiment. Before explaining this disadvantage, the above-described embodiment of the present invention is summarized with reference to FIGS. 13A and 13B.

As described above, in an optical submarine cable communication system and so forth, when a fault line is generated by a ground fault of the submarine cable and so forth, the feed line is switched to disconnect the fault line from the system. In the feed line switching during such a ground fault, it is necessary to switch before the submarine branching units are damaged because of so-called "hot switching" and so forth due to a surge current.

In a system in which a plurality of submarine branching units are used in one submarine cable communication system for effecting a multi-point communication, each submarine branching unit has a feed line switching function so that, when a fault occurs at a certain branch, the feed line is switched to disconnect the fault line from the system and to ensure communication through the remaining cables. To switch the feed line by designating the respective plural submarine branching units in one system, the respective submarine branching units have feed line switching circuits having current thresholds different from each other, and the switching circuits are separately operated by controlling the feed currents from a cable landing station. In the feeding for the switching, it is necessary to adjust the feed voltage so that the so-called "hot switching" is not generated.

Such a feed line switching method according to the above-described embodiment of the present invention is summarized with reference to FIGS. 13A to 13C.

In FIG. 13A, A, B, C and D are cable landing stations located at different points, the four cable landing stations A, B, C, and D are connected by submarine cables branched at the submarine branching units BU1 and BU2. Here, the feed line switching circuit in the submarine branching unit BU1 is operated by a current threshold $\alpha$, and the feed line switching circuit in the submarine branching unit BU2 is operated by a current threshold $\beta$. The current thresholds are assumed to be $\alpha < \beta$. The feed line switching circuits in these submarine branching units BU1 and BU2 connects, during no feed of the current in the feed line, the respective branched feed lines in the units from each other while they are insulated from the submarine earth such as the ocean floor, and by conducting the respective operating currents of the current thresholds $\alpha$ and $\beta$, one of the branched feed lines is connected to the submarine earth, and the remaining branched feed lines are interconnected.

A normal start up operation of the system is explained. Assume that feed lines are formed so that the both-end feed is effected between cable landing stations A and D, the current is fed to the cable landing stations B and C feed in a single-end feed system, respectively. The feed line switching in the submarine branching unit is effected by supplying the operating current of the current threshold to the feed line switching circuit. In this feed line switching, it is necessary to adjust the feeding voltage of the end cable landing stations A and D so as to set the potential of the feed line switching circuit with respect to the ground at zero. This is because, if the feed line switching circuit has a large potential with respect to the ground, an arc discharge may occur at the relay contacts and so forth, at the time of the switching and a so called "hot switching" may occur and may damage the devices because of a surge current due to an arc discharge.

Therefore, the cable landing stations A and D control the feed current and the feed voltage so that the feed is effected in such a way that the feed current is set to $\alpha$ and the potential of the submarine branching unit BU1 with respect to the ground is set at zero (see FIG. 13B). Whereby, in the submarine branching unit BU1, the branched feed line is connected to the submarine earth so that it becomes possible to effect a one-end feeding from the cable landing station B.

Next, a feeding is effected by setting the feed current to $\beta$ and the potential of the submarine branching unit BU2 with respect to the ground is zero (see FIG. 13C). Whereby, in the submarine branching unit BU2, the branched feed line is connected to the submarine earth so that it becomes possible to effect a one-end feeding from the cable landing station C.

In this system, if the switching in the submarine branching unit BU2 is effected at first, since the current threshold $\beta$ of the feed line switching circuit is larger than the current threshold α of the feed line switching circuit in the submarine branching unit BU1, the feed line switching circuit of the submarine branching unit BU1 will operate simultaneously. Since the potential of the submarine branching unit BU1 with respect to the ground, however, is not set at zero, the above-mentioned "hot switching" may occur at the time of the operation. Therefore, the sequence of the feed line switching must be in order from BU1 to BU2.

The problem in the above-described embodiment of the present invention is described with reference to FIGS. 14A and 14B.

In the above-described system, as shown in FIG. 14A, assume that a ground fault has occurred on the cable between the submarine branching unit BU2 and the cable landing station D. In this case, it is necessary to disconnect the fault line (the branching line to the cable landing station D) and to reconstruct the feed line by the remaining cables. To this end, the system is once reset to a non-feed state, and then it is re-started up in such a way that a both-end feed is effected between the cable landing stations A and C, a one-end feed is effected at the cable landing station B, and the cable landing station D is disconnected from the system. At this time also, since the current thresholds are in the relation $\alpha < \beta$, and the potential at the point of the ground fault at the side of the submarine branching unit BU2 is fixed at zero, even when it is desired to operate the feed line switching circuits in the order of the submarine branching units from BU1 to BU2, it is impossible to control the feed voltage between the cable landing stations A and D to set the potential of the submarine branching unit BU1 at zero. Therefore, the submarine branching unit BU1 is switched while having a positive or negative potential with respect to the ground. Also, if the fault line is disconnected first at the side of the submarine branching unit BU2 having a larger current threshold $\beta$, the submarine branching unit BU1 is also switched, as mentioned before, because the current threshold of the submarine branching unit BU2 is $\beta$.

According to the third embodiment of the present invention, the above-described problem is resolved. The third embodiment of the present invention has an object to make it possible to perform a feed line switch while preventing the hot switching during the reconstruction of the feed line when a fault occurs.

FIG. 15 shows a principal explanatory diagram of the third embodiment of the present invention.

In FIG. 15, to solve the above-mentioned problems, the feeding method in a submarine cable communication system according to the third embodiment of the present invention is a method in a submarine cable communication system for branching a submarine cable at a plurality of submarine branching units BU1, BU2, ... and for connecting a plurality of stations A, B, C, D ... Each of the submarine branching units BU1, BU2, ... comprises a feed line switching circuit having different current thresholds depending on the current directions. Namely, the feed line switching circuit in the submarine branching unit BU1 has two current thresholds $\alpha 1$ and $\beta 2$, and the feed line switching circuit in the submarine branching unit BU2 has two current thresholds $\alpha 1$ and $\beta 2$. The feed line switching circuits in the respective submarine branching units BU1, BU2, ... are constructed so as to have different current thresholds for the same feed current direction in a both-end feed line to be set. Namely, the current threshold $\alpha 1$ in the branching unit BU1 is smaller than the current threshold $\beta 1$ in the branching unit BU2, and the current threshold $\alpha 2$ in the branching unit BU2 is smaller than the current threshold $\beta 2$ in the branching unit BU1.

At the time of system start up when a fault occurs at a point on communication cable between, for example, the branching unit BU2 and the cable landing station D, between the non-fault line side station C at the side of the fault side submarine branching unit BU2 and the station A at the non-fault side submarine branching unit side BU1, the current $\alpha 2$ is supplied from the cable landing station C to the cable landing station A in the feeding current direction for operating the feed line switching circuit in the fault-side submarine branching unit BU2 by the smaller current threshold smaller than the current threshold $\beta 2$ of the non-fault side submarine branching unit BU1, so that the feed line is switched to disconnect the fault line in the branching unit BU2, and then a larger feeding current $\beta 2$ is supplied from the cable landing station C to the cable landing system A in the same direction so that the feed line switching circuit in the non-fault side submarine branching unit BU1 is switched to set a feed line between the cable landing station C and the cable landing station A. Note that, the cable landing stations A and C perform both-ends feeding, while the cable landing station B performs one-end feeding.

As another aspect of the feeding method in a submarine cable communication system according to the third embodiment of the present invention, the feed line switching circuits in the submarine branching units are sequentially operated in the order from the submarine branching unit side having a smaller current threshold to switch the feed line. A plurality of submarine branching units BU1, BU2, ... are arranged in series along the feed line. Feeding is effected from both sides of the submarine branching units. The operating sequences of the feed line switching circuits in the plurality of the submarine branching units are opposite depending on the direction of the feeding current.

It should be noted that, according to the third embodiment of the present invention, all of the branching units are not necessary for the above-mentioned switching circuits, each having two current thresholds different depending on the current direction. It is sufficient that at least two of the branching units have switching circuits having current thresholds which are different depending on the current direction. The other branching units may not have such a switching circuit having current thresholds different depending on the current direction.

The feed line switching circuit according to the third embodiment of the present invention comprises a first current branching circuit, connected parallel with a driving circuit for conducting an operating current having the current threshold to drive the feed line switching circuit, for conducting a first current in one direction only; and a second current branching circuit, connected parallel with the driving circuit, for conducting, in the direction opposite the direction of the current through said first current branching circuit, a second current different from said first current.

The feeding method according to the third embodiment of the present invention uses the above-mentioned feed line switching circuit.

The principle of the operation in the third embodiment of the present invention is explained by using the submarine cable communication system shown in FIG. 15 as an example. In the figure, A, B, C, and D are stations such as cable landing stations, and BU1 and BU2 are submarine branching units. The operating currents of the submarine branching units BU1 and BU2 are as follows. Namely, when the feed current flows in the direction from the submarine branching unit BU1 to the submarine branching unit BU2 (in the direction marked→ in the figure), the current threshold of the operating current of the submarine branching unit BU1 is $\alpha 1$ and the current threshold of the operating current of the submarine branching unit BU2 is $\beta 1$; and when the feed current flows in the direction from the submarine branching unit BU2 to the submarine branching unit BU1 (in the direction marked← in the figure), the current threshold of the operating current of the submarine branching unit BU1 is $\beta 2$ and the current threshold of the operating current of the submarine branching unit BU2 is $\alpha 2$. The operating currents are in the relation $\alpha 1 < \beta 1$ and $\alpha 2 < \beta 2$.

The normal start-up operation of the system shown in FIG. 15 is the same as in the conventional system. Assume that a ground fault has been generated in the cable between the submarine branching unit BU2 and the cable landing station D. Then, a both-end feed line is to be set between the stations A and C, and the fault line to the station D is to be disconnected. When a feed current is conducted in the direction from the station A to the station C, however, the problem as described before occurs.

Therefore, the current direction is controlled by the stations A and C so that the direction of the feed current between the stations A and C is in the direction from the station C to the station A (in the direction of←). By this, the operating current of the submarine branching unit BU2 becomes $\alpha 2$, and the operating current of the submarine branching unit BU1 becomes $\beta 2$. Here, since there is the relation $\alpha 2 < \beta 2$, the switching is effected in the sequence of the branching units BU2 and BU1.

Namely, at first, the feed current $\alpha 2$ is conducted from the cable landing station C so that the fault line connected to the station D is grounded in the submarine branching unit BU2. Further, the connection between the fault line and the submarine branching unit BU2 is disconnected in the submarine branching unit BU2. By this disconnection, the potential of the submarine branching unit BU2 is not influenced by the zero potential at the fault point. Therefore, when the feed line connected to the station B is switched in the next submarine branching unit BU1 to connect to the submarine earth, it is possible to control both end stations A and C so as to set the operating current at $\beta 2$ and the potential of the submarine branching unit BU1 with respect to the ground at zero, and thus hot switching can be prevented.

In the feed line switching circuit used in the above-described feeding method according to the third embodiment of the present invention, when a current flowing through the first branching unit BU1 is made larger than the current flowing through a second current branching circuit, the operating current branched to a driving circuit of the feed line switching circuit when a supplying current is conducted in the conducting direction of the first current branching unit is $\alpha$, and the operating current branched to the driving circuit when a supplying current is conducted in the conducting direction of the second current branching unit is $\beta$, where $\alpha < \beta$. Accordingly, in this feed line switching circuit, by changing the conducting direction of the operating current, the amount of operating current can also be changed.

Figure 16:
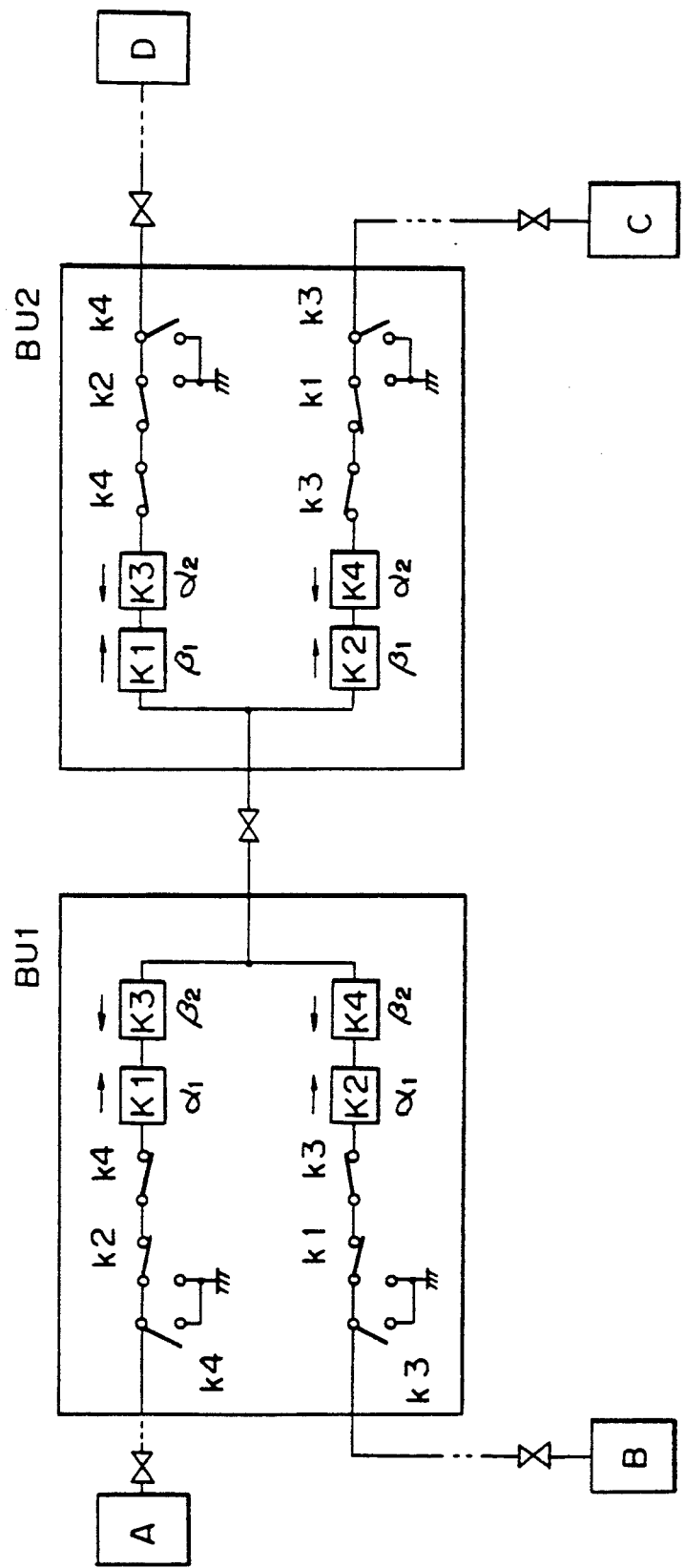
FIG. 16 is a block diagram showing a submarine cable communication system according to an embodiment of the present invention.

FIG. 16 is a block diagram showing in detail the submarine cable communication system using the feeding method according to the third embodiment of the present invention as generally explained with reference to FIG. 15. In the figure, A, B, C, and D are cable landing stations, and BU1 and BU2 are submarine branching units. K1 to K4 in the submarine branching units BU1 and BU2 are relays. Arrows provided to the respective relays K1 to K4 represent the directions of the operating currents by which the respective relays are activated. $\alpha 1$, $\alpha 2$, $\beta 1$, and $\beta 2$ are the current thresholds of the operating currents by which the respective relays are activated. The operating currents are in the relation $\alpha 1 < \beta 1$ and $\alpha 2 < \beta 2$. The contacts of the respective relays K1 to K4 are represented by ① to ④ corresponding to the respective relays. These reference symbols are also used in the later described embodiments.

In this embodiment shown in FIG. 16, by the operating current $\alpha 1$ in the direction from the left to the right in the figure, the relay K1 or K2 in the branching unit BU1 is actuated, and by the operating current $\beta 1$ in the same direction, the relay K1 or K2 in the branching unit BU2 is actuated. On the other hand, by the operating current $\alpha 2$ in the direction from the right to the left in the figure, the relay K3 or K4 in the branching unit BU2 is actuated, and by the operating current $\beta 2$ in the same direction, the relay K3 or K4 in the branching unit BU1 is actuated.

During the normal system start up, it is assumed that, for example, between the cable landing stations A and D is set a both-end feed, and the cable landing stations B and C are set to be one-end feeds. To this end, at first, a feed current $\alpha 1$ is conducted in the direction from the cable landing station A to the cable landing station D to actuate the relay K1 connected to the cable landing station A through the contacts k2 and k4 in the submarine branching unit BU1, resulting in the contact k1 to be actuated so that the branched feed line connected to the cable landing station B is connected to the submarine earth, and after this, the operating current $\beta 1$ is conducted to operate the relay K1 in the submarine branching unit BU2, resulting in the contact k1 to be actuated so that the branched feed line connected to the cable landing station C is connected to the submarine earth. Note that, in or during the switching in each of the submarine branching units BU1 and BU2, the feed voltage is adjusted by both-end cable landing stations so that the potential at each of the submarine branching units BU1 and BU2 is set at zero with respect to the ground. This is the same as in the following embodiments.

After the above-described normal system start up, assume that a ground fault has occurred in the cable between the submarine branching unit BU2 and the cable landing station D. In this case, the system as a whole is once reset to a non-feed state, and then, the feed lines are switched in such a way that a both-end feed is effected between the cable landing stations A and C, and a one-end feed is effected by the cable landing station B.

Between the cable landing stations A and C, the direction of the feed current from the cable landing stations A and C is adjusted to conduct the feed current from the cable landing station C to the cable landing station A (in the direction ←). First, when the feed current α2 is conducted, the relay K4 in the submarine branching unit BU2 is actuated to open and close the contacts k4, whereby the fault branched feed line leading to the cable landing station D is connected to the submarine earth, and is disconnected from the feed line between the cable landing stations A and C. After this, by conducting the feed current β2 to actuate the relay K3 in the submarine branching unit BU1, the contacts k3 are opened and closed so that the cable landing station B is connected to the submarine earth and is disconnected from the feed line between the cable landing stations A and C.

In the afore-mentioned third embodiment shown in FIG. 16, there is a disadvantage, namely, when a ground fault occurs between the submarine branching units BU1 and BU2, the total system becomes system down because the one-end feeding stations B and C are always grounded.

Figure 17:
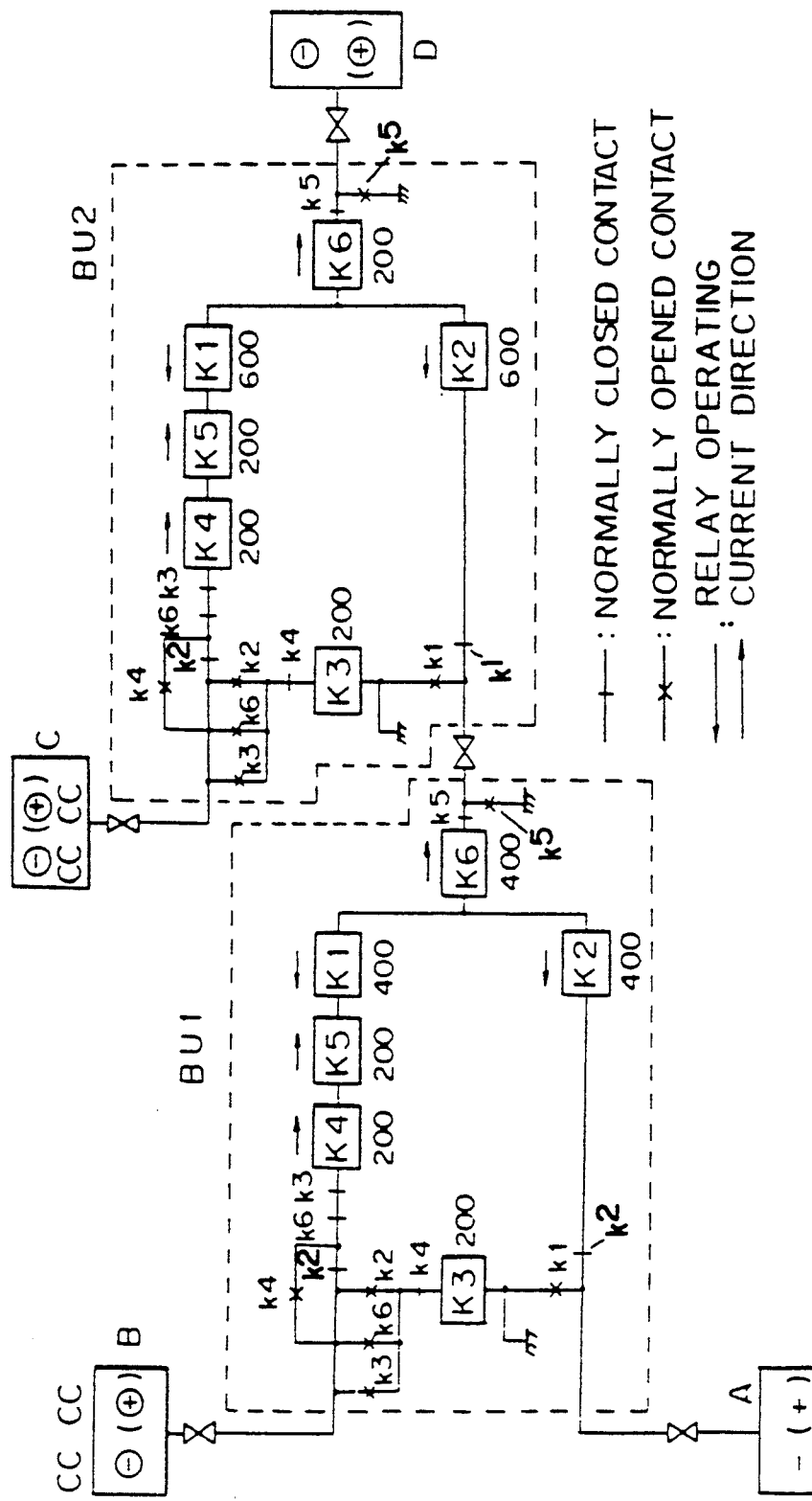
FIG. 17 is a block diagram showing another embodiment of the present invention.
Figure 18:
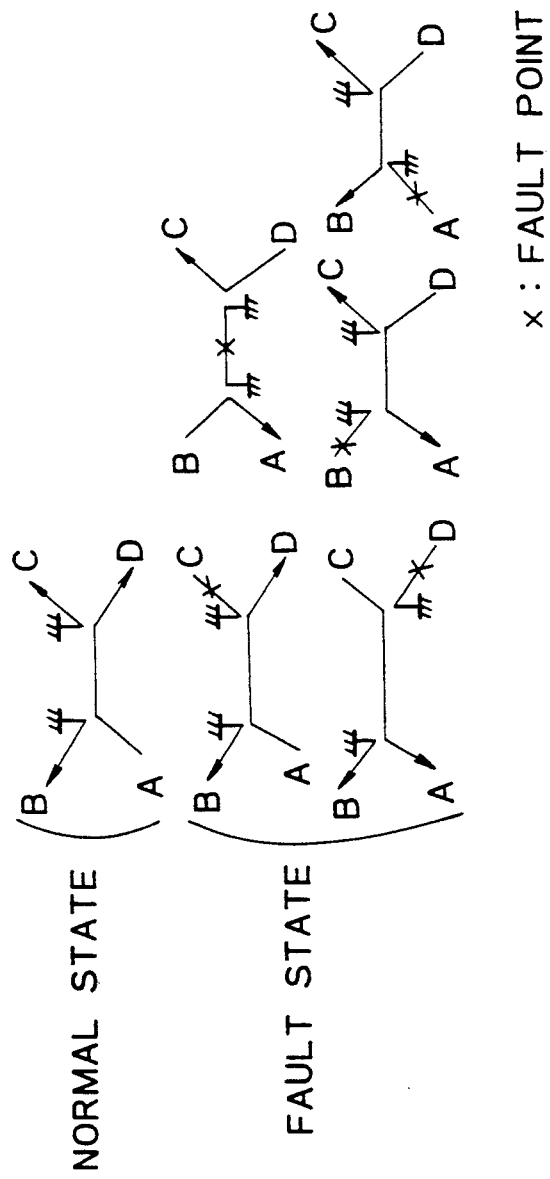
FIG. 18 is a diagram explaining the modes of the feed lines which are possible to be set in the system of an embodiment shown in FIG. 17.

FIG. 17 shows a modification of the above-described third embodiment of the present invention, and FIG. 18 shows possible feed lines set according to the embodiment shown in FIG. 17. The embodiment shown in FIG. 17 solves the problem in the embodiment shown in FIG. 16. In FIG. 17, the operating currents of relays K1 to K6 are $\alpha1=\alpha2=\alpha=200$ mA, $\beta1=\beta2=\beta=400$ mA, and $\gamma=600$ mA. Each relay corresponds to a normally closed contact and a normally opened contact.

In the unit BU1, the relay K2 is connected between the station A and the relay K6, and the relays K4, K5, and K1 are connected in series between the station B and the relay K6. The relay K3 is connected between the stations A and B. On the feed line between the station A and the relay K2, the normally closed contact k1 is connected. On the feed line between the station B and the relay K4, the normally closed contacts k2, k6, and k3 are connected in series. The normally opened contact k4 is connected parallel with the normally closed contact k2. The normally opened contacts k2, k3, and k6 are connected parallel between the station B and the relay K3. The normally closed contact k4 is connected between the contact k2 and the relay K3. The normally opened contact k1 is connected between the station A and the relay K3. The point between the relay K3 and the contact k1 is grounded. The normally closed contact k5 is connected between the relay K6 and the branching unit BU2. The normally opened contact k5 is connected between the feed line from the unit BU1 and the ground.

In the branching units BU2, the relay K2 is connected between the unit BU1 the relay K6 in the unit BU2, and the relays K4, K5, and K1 are connected in series between the station C and the relay K6. The relay K3 is connected between the station C and the unit BU1. On the feed line between the unit BU1 and the relay K2, the normally closed contact k1 is connected. On the feed line between the station C and the relay K4, the normally closed contacts k2, k6, and k3 are connected in series. The normally opened contact k4 is connected parallel with the normally closed contact k2. The normally opened contacts k2, k3, and k6 are connected parallel between the station C and the relay K3. The normally closed contact k4 is connected between the contact k2 and the relay K3. The normally opened contact k1 is connected between the unit BU1 and the relay K3. The point between the relay K3 and the contact k1 is grounded. The normally closed contact k5 is connected between the relay K6 and the station D. The normally opened contact k5 is connected between the feed line from the station D and the ground.

First, during a normal state, a both-end feed is effected between the cable landing stations A and D, and one-end feeds are effected from the cable landing stations B and C, respectively. To this end, at the time of the system start up, the feed current α of 200 mA is conducted from the cable landing station A to the cable landing station D to actuate a relay K6 in the submarine branching unit BU2 so that a normally closed contact k6 is opened, resulting in that the cable landing station C is disconnected from the feed line, and a normally opened contact k6 is closed, resulting in that the cable landing station C is connected to the submarine earth. Then, by conducting the feed current β of 400 mA, the relay K6 in the submarine branching unit BU1 is actuated so that the cable landing station B is disconnected from the feed line and is connected to the submarine earth.

Assume that a ground fault occurs in the cable between, for example, the submarine branching unit BU2 and the cable landing station D. Then, a both-end feed is effected between the cable landing stations A and C, and a one-end feed is effected by the cable landing station B. To this end, the feed current α of 200 mA is conducted from the cable landing station C to the cable landing station A to actuate the relays K4 and K5 in the submarine branching unit BU2, resulting in that the cable landing station D is disconnected from the feed line and is connected to the submarine earth. Then, by conducting the feed current β of 400 mA, the relay K2 in the submarine branching unit BU1 is actuated so that the cable landing station B is disconnected from the feed line and is connected to the submarine earth.

When a fault occurs on a point between the branching units BU1 and BU2, both-end feedings are effected between the cable landing stations A and B, and between the cable landing stations C and D, through the normally closed contacts k6 on the feed lines, as shown in FIG. 18.

The other possibility of the feed lines can also be understood with reference to FIG. 18.

Figure 19:
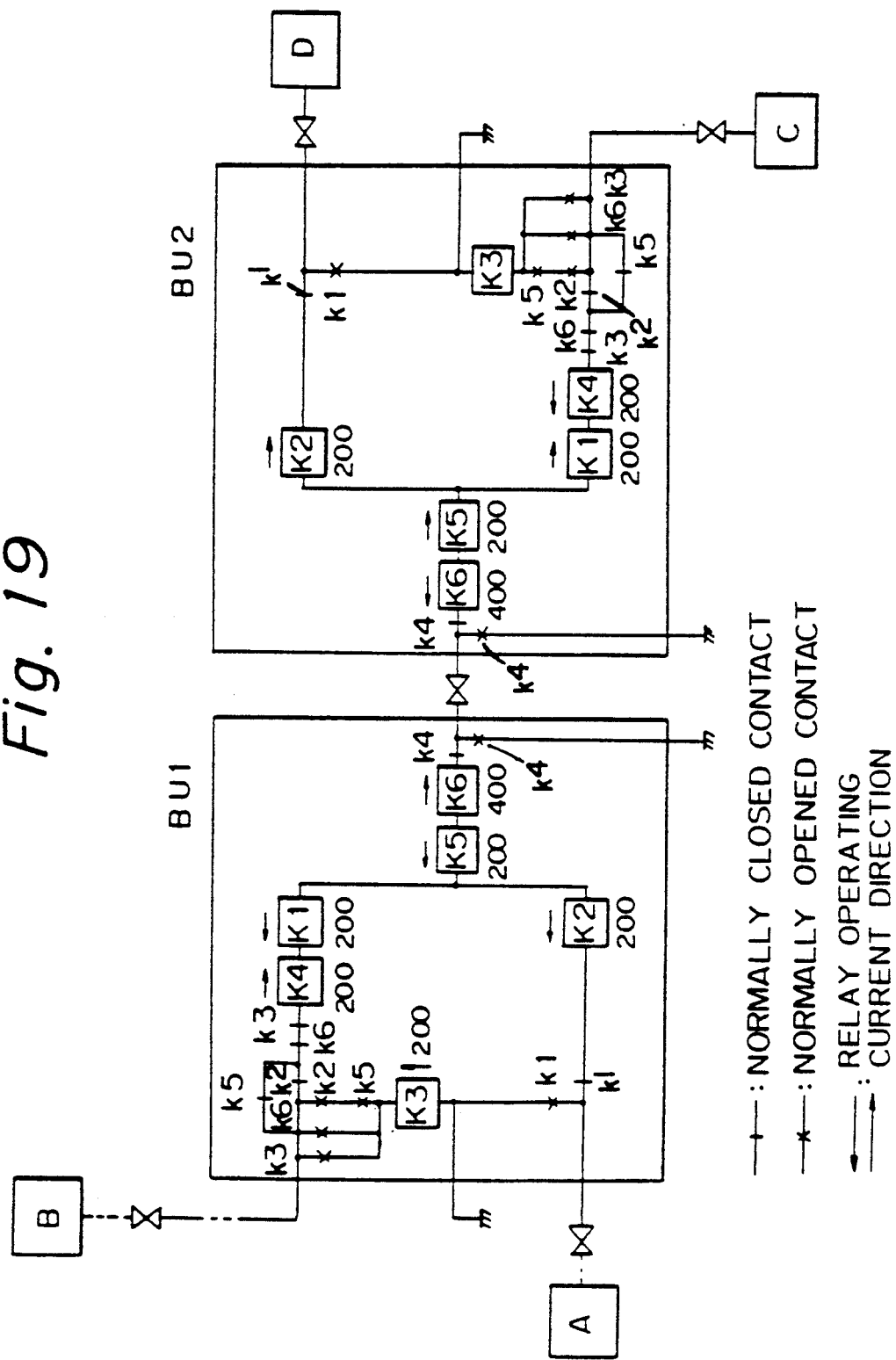
FIG. 19 is a block diagram showing still another embodiment of the present invention.
Figure 20:
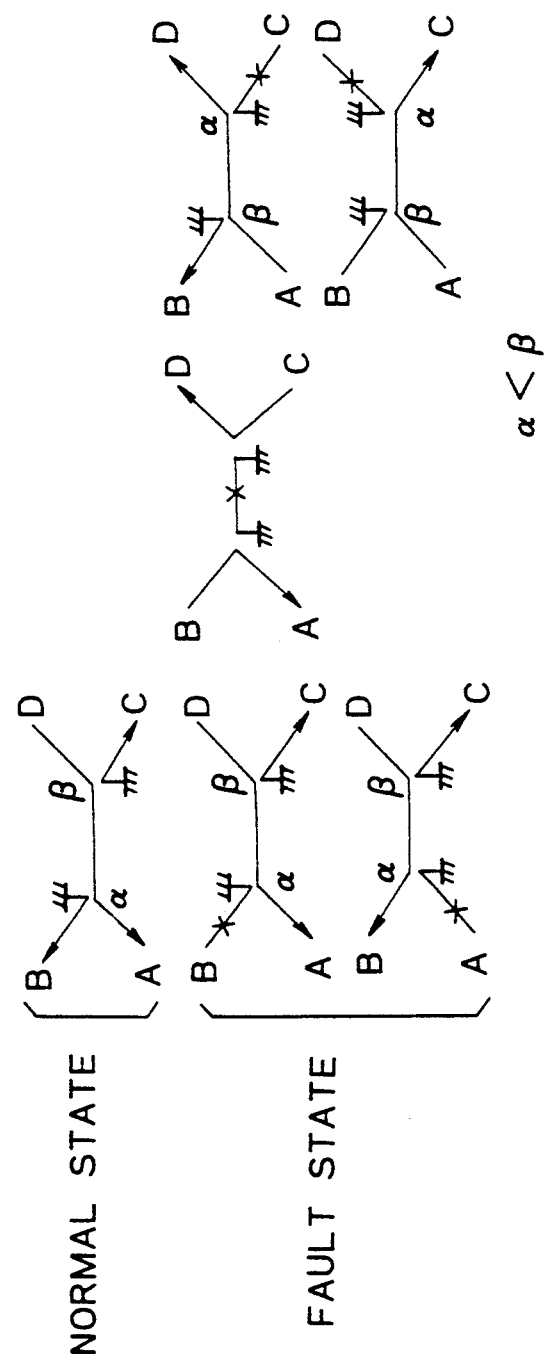
FIG. 20 is a diagram explaining the modes of the feed lines which are possible to be set in the system of an embodiment shown in FIG. 19.

FIG. 19 shows still another embodiment of the present invention. FIG. 20 shows feed lines possible to be set according to the embodiment shown in FIG. 19. The operating currents of the respective relays are $\alpha=200$ mA and $\beta=400$ mA.

First, during a normal state, a both-end feed is effected between the cable landing stations A and D, and one-end feeds are effected at the cable landing stations B and C, respectively. To this end, at the time of the system start up, the feed current of 200 mA is conducted in the direction from the cable landing station A to the cable landing station D to actuate the relays K2 and K5 in the submarine branching unit BU2 so that a normally closed contact k2 is opened, a normally opened contact k2 is closed, a normally closed contact k5 is opened and a normally opened contact k5 is closed, resulting in the cable landing station C being disconnected from the feed line provided between the cable landing stations A and D and the submarine cable connected to the earth. Then, by conducting the feed current of 400 mA, the relay K6 in the submarine branching unit BU1 is actuated so that the cable landing station B is disconnected from the feed line and is connected to the submarine earth. Note that a similar operation is effected when a feed current is conducted from the cable landing station D to the cable landing station A.

Assume that a ground fault occurs in the cable between, for example, the submarine branching unit BU2 and the cable landing station D. Then, a both-end feed is effected between the cable landing stations A and C, and a one-end feed is effected by the cable landing station B. To this end, the feed current of 200 mA is conducted in the direction from the cable landing station A to the cable landing station C to actuate the relays K1 and K5 in the submarine branching unit BU2, resulting in that the cable landing station D is disconnected from the feed line and is connected to the submarine earth. Then, by conducting the feed current of 400 mA, the relay K6 in the submarine branching unit BU1 is actuated so that the cable landing station B is disconnected from the feed line and is connected to the submarine earth.

In the embodiment shown in FIG. 19 also, when a fault occurs on a point between the branching units BU1 and BU2, both-end feedings are effected between the cable landing stations A and B, and between the cable landing stations C and D, as shown in FIG. 20.

The other feed lines can also be understood with reference to FIG. 20.

Figure 21:
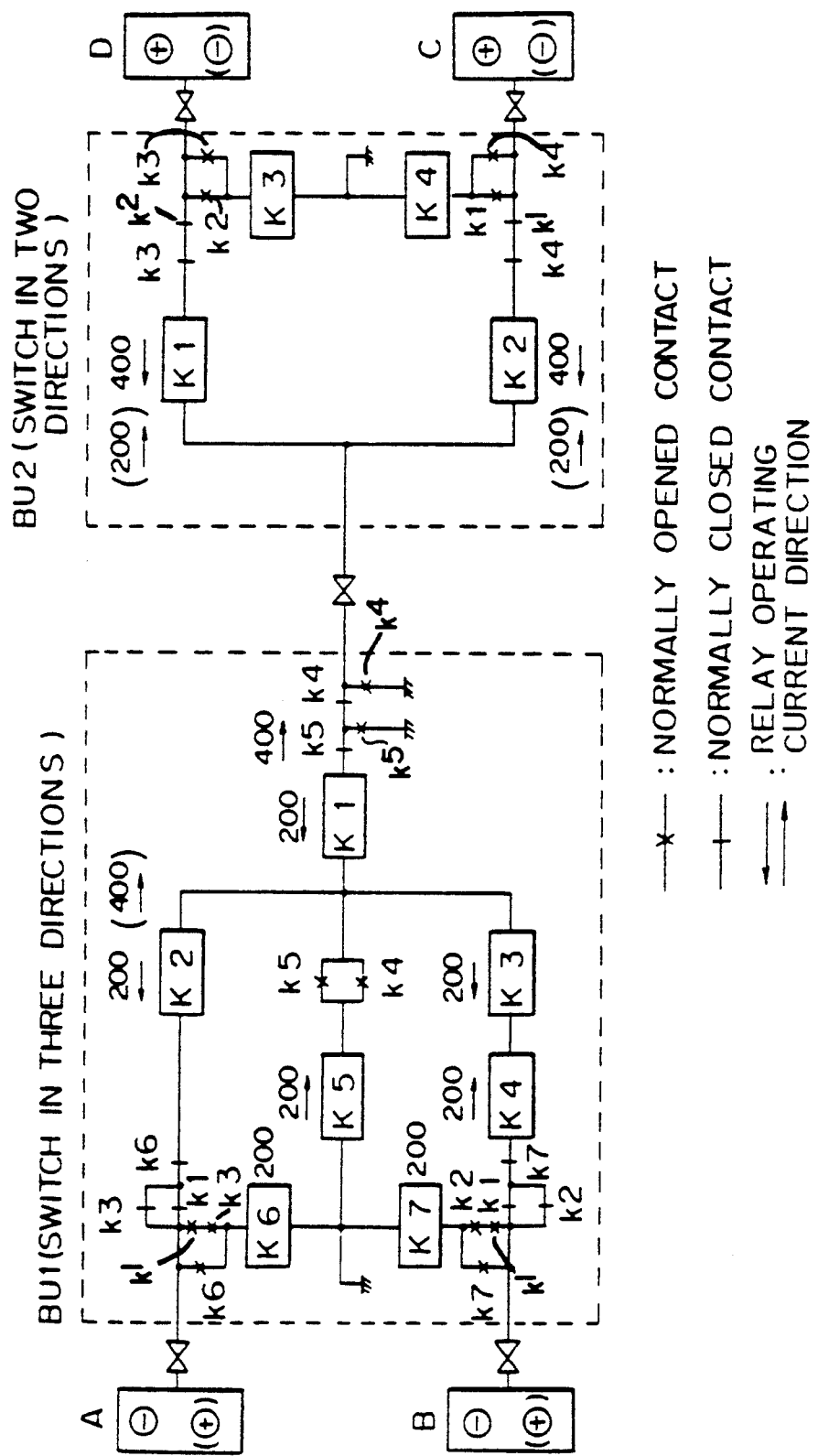
FIG. 21 is a block diagram showing a still another embodiment of the present invention.
Figure 22:
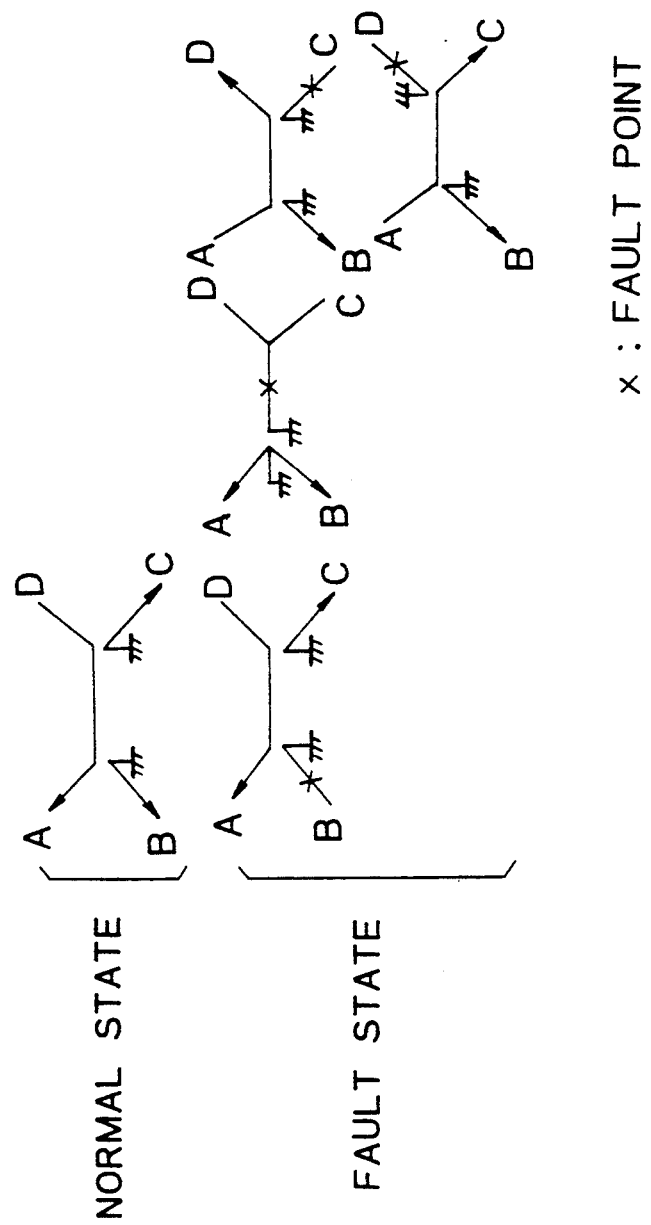
FIG. 22 is a diagram explaining the modes of the feed lines which are possible to be set in the system of an embodiment shown in FIG. 21.

FIG. 21 shows still another embodiment of the present invention. FIG. 22 shows feed lines possibly set according to the embodiment shown in FIG. 21. The operating currents of the respective relays are $\alpha=200$ mA and $\beta=400$ mA. K1 and K2 are relays having operating currents, amounts of which change depending on the direction of the operating currents. By using such relays K1 and K2 in the feed line switching circuit, the switching mode of the feed line switching circuit can be changed depending on the direction and the amount of the feed current. An example of the construction of relays K1 and K2 is described in more detail later.

First, during a normal state, a both-end feed is effected between the cable landing stations A and D, and one-end feeds are effected at the cable landing stations B and C, respectively. To this end, at the time of the system start up, the feed current of 200 mA is conducted in the direction from the cable landing station D to the cable landing station A to actuate the relays K1 and K2 in the submarine branching unit BU1, resulting in that the cable landing station B is disconnected from the feed line and is connected to the submarine earth. Then, by conducting the feed current of 400 mA, the relay K1 in the submarine branching unit BU2 is actuated so that the cable landing station C is disconnected from the feed line and is connected to the submarine earth.

Assume that a ground fault occurs in the cable between, for example, the submarine branching unit BU2 and the cable landing station D. Then, a both-end feed is effected between the cable landing stations A and C, and a one-end feed is effected by the cable landing station B. To this end, the feed current of 200 mA is conducted in the direction from the cable landing station A to the cable landing station C to actuate the relay K2 in the submarine branching unit BU2, resulting in that the cable landing station D is disconnected from the feed line and is connected to the submarine earth. Then, by conducting the feed current of 400 mA, the relays K1 and K2 in the submarine branching unit BU1 are actuated so that the cable landing station B is disconnected from the feed line and is connected to the submarine earth.

In the embodiment shown in FIG. 21 also, when a fault occurs on a point between the branching units BU1 and BU2, both-end feedings are effected between the cable landing stations A and B, and between the cable landing stations C and D, as shown in FIG. 22.

The other feed lines can also be understood with reference to FIG. 22.

Figure 23:
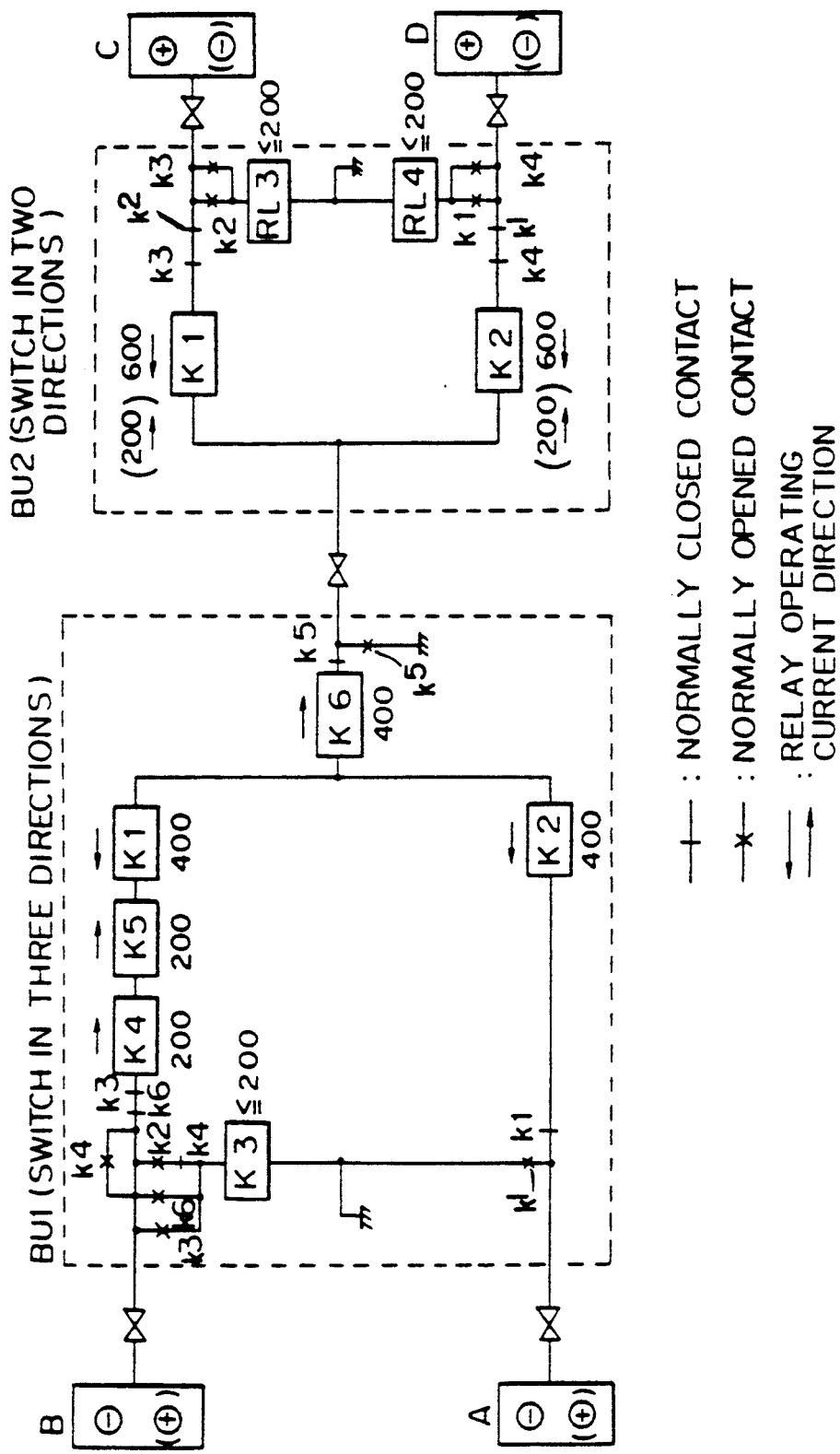
FIG. 23 is a block diagram showing a still another embodiment of the present invention.
Figure 24:
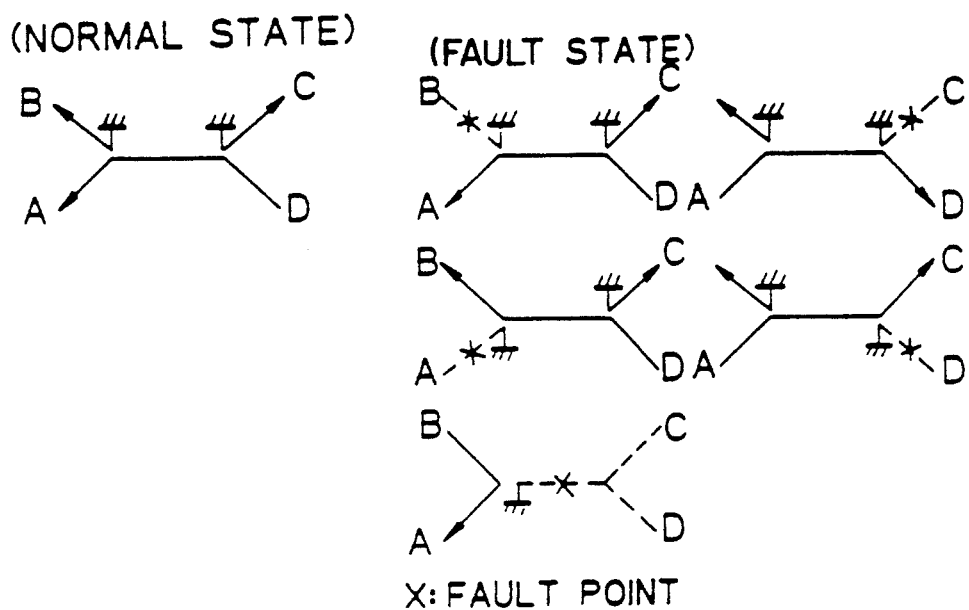
FIG. 24 is a diagram explaining the modes of the feed lines which are possible to be set in the system of an embodiment shown in FIG. 23.

FIG. 23 shows still another embodiment of the present invention. FIG. 24 shows feed lines possible to be set according to the embodiment shown in FIG. 23. The operating currents of the respective relays are $\alpha=200$ mA and $\beta=400$ mA at the submarine branching unit BU1 side, and are $\alpha=200$ mA and $\beta=400$ mA at the submarine branching unit BU2 side. K1 and K2 in the submarine branching unit BU2 are relays having operating currents the amounts of which are changed by changing the direction of the operating currents.

First, during a normal state, a both-end feed is effected between the cable landing stations A and D, and one-end feeds are effected at the cable landing stations B and C, respectively. To this end, at the time of the system start up, the feed current of 400 mA is conducted in the direction from the cable landing station D to the cable landing station A to actuate the relay K2 in the submarine branching unit BU1, resulting in that the cable landing station B is disconnected from the feed line and is connected to the submarine earth. Then, by conducting the feed current of 600 mA, the relay K2 in the submarine branching unit BU2 is actuated so that the cable landing station C is disconnected from the feed line and is connected to the submarine earth.

Assume that a ground fault occurs in the cable between, for example, the submarine branching unit BU2 and the cable landing station D. Then, a both-end feed is effected between the cable landing stations A and C, and a one-end feed is effected by the cable landing station B. To this end, the feed current of 200 mA is conducted in the direction from the cable landing station A to the cable landing station C to actuate the relay K1 in the submarine branching unit BU2, resulting in that the cable landing station D is disconnected from the feed line and is connected to the submarine earth. Then, by conducting the feed current of 400 mA, the relay K6 in the submarine branching unit BU1 is actuated so that the cable landing station B is disconnected from the feed line and is connected to the submarine earth.

When a fault occurs on a point between the stations A and D, a both-end feeding is effected between the stations A and B as shown in FIG. 24.

The feed lines can also be understood with reference to FIG. 24.

Next, the construction of the relay is described in which the amount of the operating current is changed by changing the direction of the feed current, such as the relays K1 and K2 used in the embodiments shown in FIGS. 21 and 23.

Figure 25:
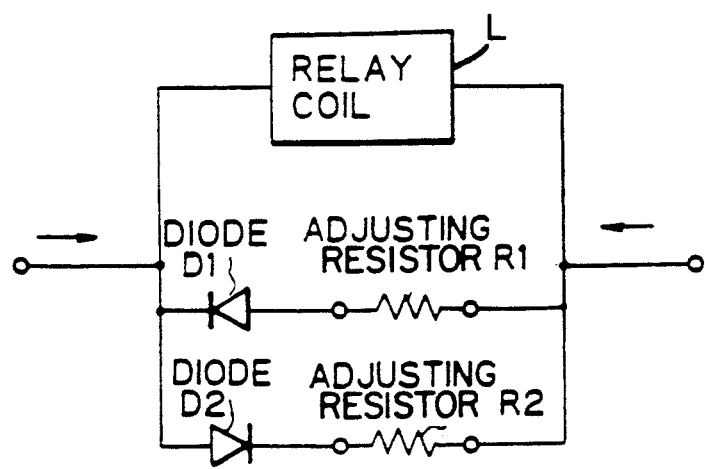
FIG. 25 is a diagram showing an example of a feed line switching circuit as an embodiment of the present invention.

FIG. 25 shows an example of the construction of the relay having different current thresholds depending on the current direction. In the figure, L is a relay coil which is a driving circuit in the feed line switching circuit. To the relay coil L, a series circuit consisting of a diode D1 and an adjusting resistor R1, and a series circuit consisting of a diode D2 and an adjusting resistor R2 are connected parallel respectively. The diode D1 and the diode D2 are for limiting the current directions. The polarities in the connections are opposite each other. Also, the adjusting resistors R1 and R2 have different resistance values.

By constructing as above, when a feed current is supplied in the direction from the right to the left in the figure (expressed by ← in the following), a part of the feed current is branched to the adjusting resistor R1; and when a feed current is supplied in the direction from the left to the right in the figure (expressed by → in the following), its part is branched to the adjusting resistor R2. Since the resistance values of the adjusting resistors R1 and R2 are different, the branched current values are different. In conclusion, to conduct through the relay coil L an operating current greater than a predetermined value in order to drive the relay, the amount of the feed current when it is conducted in the ← direction and the amount of the feed current when it is conducted in the → direction are different. For example, assume that the adjusting resistance R1 is larger than the adjusting resistance R2. Then, when the feed current in the ← direction is $\alpha$, the relay does not operate until a feed current $\beta$ larger than $\alpha$ is conducted in the → direction.

Figure 26:
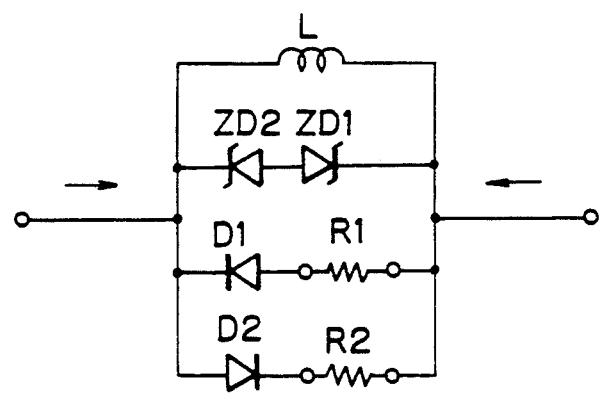
FIG. 26 is a diagram showing an example of a feed line switching circuit as an another embodiment of the present invention.

FIG. 26 shows another example of a construction of a device having different operating currents depending on the direction of the operating current. The difference between this circuit and the circuit shown in FIG. 25 is that a series circuit consisting of Zener diodes ZD1 and ZD2 connected in series in opposite polarities is connected parallel with the relay coil L. The Zener diodes ZD1 and ZD2 form a protection circuit for protecting the relay coil from being applied with excessive voltage.

In this circuit, when a feed current is conducted in the direction →, if the feed current is gradually increased from zero, the feed current is branched to the relay coil L side and to the adjusting resistor R2 side. Then, the relay will be actuated by the current value set by the adjusting resistor R2. When the feed current is further increased, a current starts to flow through the Zener diode ZD2, and the voltage across the relay coil is fixed to a constant value by the Zener voltage. Therefore, the operating current flowing through the relay coil L is limited so that the coil L can be protected. When a feed current is conducted in the ← direction, the Zener diode ZD1 can protect the coil by means of the Zener diode ZD1.

Figure 27:
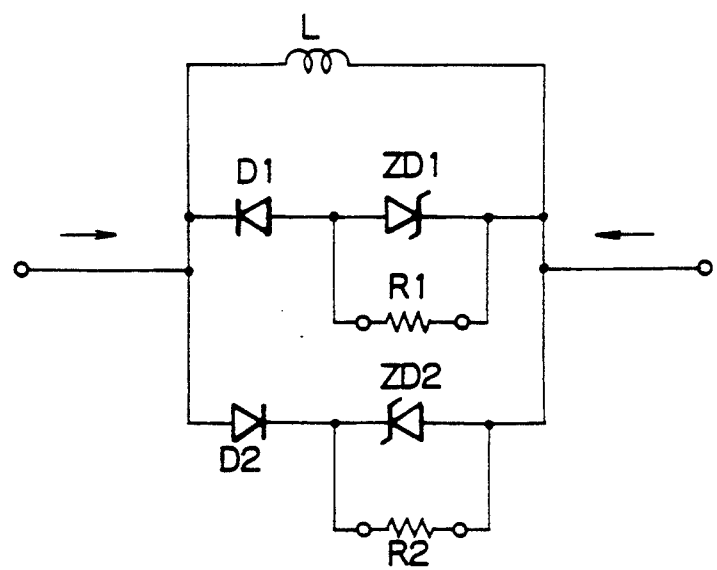
FIG. 27 is a diagram showing an example of a feed line switching circuit as a still another embodiment of the present invention.

FIG. 27 shows a still another example of a construction of a device having different operating currents depending on the direction of the operating current. The difference between this circuit and the above-described circuit shown in FIG. 25 is that a protecting Zener diode ZD1 is connected parallel with the adjusting resistor R1, and a protecting Zener diode ZD2 having a polarity opposite the polarity of the Zener diode ZD1 is connected parallel with the adjusting resistor R1.

The operation of this circuit is almost the same as that of FIG. 26. Namely, when a feed current is conducted in the direction →, if the feed current is gradually increased from zero, the feed current is branched to the relay coil L side and to the adjusting resistor R2 side. Then, the relay will be actuated by the current value set by the adjusting resistor R2. When the feed current is further increased, a current will start to flow through the Zener diode ZD2, and the voltage across the relay coil is fixed to a constant value by the Zener voltage. Therefore, the operating current flowing through the relay coil L is limited so that the coil L can be protected. When a feed current is conducted in the ← direction, the Zener diode ZD1 can protect the coil by means of the Zener diode ZD1.

Figure 28A:
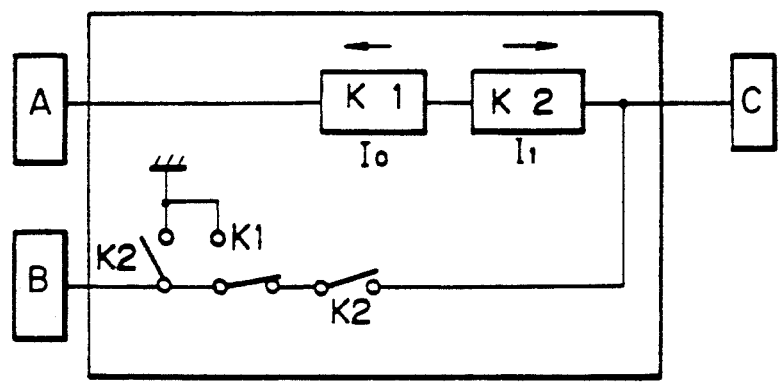
FIG. 28A and 28B are diagrams showing an example of a circuit in which a contact located at the same position is actuated by different current values depending on the current direction.
Figure 28B:
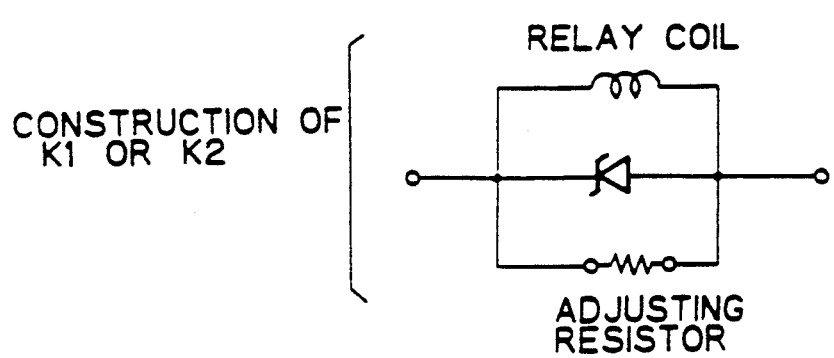

As a device in which the operating current is changed depending on the direction of the current, other than the above-described circuits shown in FIG. 25 to FIG. 27, the circuit used in the embodiment in FIG. 16, i.e., the circuit shown in FIGS. 28A and 28B may of course be used. However, by constructing the relay as described above with reference to FIGS. 25 to 27, the relay may be single and the construction of the contacts may be simplified.

As described above, according to the first and the second embodiments of the present invention, a plurality of branching units are provided on branching points on a feed line, each branching unit having at least one switching circuit which is switched depending on the current flowing through the feed line, the switching circuits having current thresholds different from each other.

Therefore, according to the above-described embodiments of the present invention, the switching of the plurality of branching units can be performed by a current control or a voltage control at each terminal station, whereby it is possible to accommodate a communication system capable of communicating among a large number and a wide range of stations. In addition the switching of the present invention is highly efficient in use, very convenient, and has or supports a developing and complex communication network.

Further according to the feeding method of the present invention, in the reconstruction of a feeding system when a fault occurs and so forth, it is possible to switch a feed line in each submarine branching unit while preventing a so-called hot switching, resulting in an improvement in the reliability of the submarine cable communication system.

In addition, according to the feed line switching circuit of the present invention, the circuit can be miniaturized and simplified.

What is claimed is:

1. A feeding system for supplying a current to repeaters on a communication cable, said communication cable including a feed line for conducting a feed current to said repeaters and branching points, said feeding system comprising:
   branching units provided at the branching points connected to said communication cable; and
   terminal stations each being connected through at least one of said repeaters to one of said branching units, each of said terminal stations feeding the feed current through said feed line to said at least one of said repeaters,
   each of said branching units having at least one switching circuit connecting said at least one of said repeaters to one of said communication cable and ground, depending on an amount of the feed current conducting through said feed line in said communication cable, and
   said at least one switching circuit in each of said branching units having a current threshold different from other current thresholds in other switching circuits.

2. A feeding system as claimed in claim 1, wherein said at least one switching circuit in each of said branching units includes switching circuits, and thresholds of the switching circuits in said branching units are different from each other.

3. A feeding system as claimed in claim 1, wherein the communication cable includes a non-repeater line interval in which no repeater is provided for said non-repeater line interval.

4. A feeding system as claimed in claim 1, wherein said terminal stations include at least first, second and third stations,
   wherein said branching units include a fault side branching unit having a fault side switching circuit and a non-fault side branching unit having a non-fault side switching circuit, and
   wherein each of said at least one switching circuit has operating currents depending on current directions, the at least one switching circuit in each of the branching units having different operating currents for a same feed current direction in a both-end feed line, whereby at a time of system start upon when a fault occurs between the third station and the fault side branching unit, a current is supplied with a feeding current direction for operating the fault side switching circuit in the fault side branching unit using a first feeding current disconnecting the fault branch line from said feed line, and then a second feeding current larger than said first feeding current is supplied in the same feed current direction for switching the non-fault switching circuit in the non-fault side branching unit connecting the second station to said feed line.

5. A feeding system as claimed in claim 4, wherein said at least one switching circuit comprises:
   a driving circuit conducting the operating currents to drive the switching circuit;
   a first current branching circuit, connected parallel with said driving circuit and conducting a first current in one direction; and
   a second current branching circuit, connected parallel with said driving circuit, for conducting, in a second direction opposite the one direction of the first current conducted through said first current branching circuit, a second current different from said first current.

6. A feeding system as claimed in claim 2, wherein the communication cable includes a non-repeater line interval in which no repeater is provided for said non-repeater line interval.

7. A feeding system for supplying a current to repeaters on a communication cable, said communication cable including a feed line for conducting a feed current to said repeaters, said feeding system comprising:
   branching units provided at branching points on said communication cable; and
   terminal stations each being connected through at least one of said repeaters to one of said branching units, and each of said terminal stations feeding said feed current through said feed line to said at least one of said repeaters,
   wherein each of said branching units having at least one switching circuit having a current threshold and connecting said at least one of said repeaters to one of said communication cable and ground, responsive to an amount of current conducting through said feed line in said communication cable, and the current threshold of each of the at least one switching circuit in said branching units being different from each other,
   wherein when a switching instruction, used for switching a feeding line provided in the submarine branching unit, is transmitted to said branching units, first currents having first values greater than the current threshold are sequentially supplied in a first order increasing in current magnitude form a first smaller current threshold to a first larger current threshold, and
   wherein when an instruction used for returning a feeding line provided in the submarine branching unit to the previous condition is transmitted to said branching units, second currents having second values greater than the current threshold are sequentially supplied in a second order decreasing in the current magnitude from a second larger current threshold to a second smaller current threshold.

8. A feeding system as claimed in claim 7, wherein when the switching instruction used for switching a feeding line provided in the submarine branching unit is transmitted to said one of said branching units, a voltage of the one of said branching units is set to ground potential before supplying the first currents greater than the current threshold of said at least one switching circuit in said one of said branching units, and
   wherein when an instruction used for returning a feeding line provided in the submarine branching unit to the previous condition is transmitted to said one of said branching units, the voltage of the one of said branching units is set to the ground potential before supplying the second currents greater than the current threshold of said at least one switching circuit in said one of said branching units.

9. A feeding system as claimed in claim 7, wherein the communication cable includes a non-repeater line interval in which no repeater is provided for said non-repeater line interval.

10. A feeding system as claimed in claim 7,
    wherein said terminal stations include at least first, second and third stations,
    wherein said branching units include a fault side branching unit having a fault side switching circuit and a non-fault side branching unit having a non-fault side switching circuit, and
    wherein each of said at least one switching circuit has operating currents depending on current directions, the at least one switching circuit in each of the branching units having different operating currents for a same feed current direction in a both-end feed line, and at a time of system start up when a fault occurs between the third station and the fault side branching unit, a current is supplied with a feeding current direction for operating the fault side switching circuit in the fault side branching unit using a first feeding current disconnecting the third station from said feed line, and then a second feeding current larger than said first feeding current is supplied in the same feed current direction for switching the non-fault switching circuit in the non-fault side branching unit connecting the second station to said feed line.

11. A feeding system as claimed in claim 7, wherein operating sequences of the at least one switching circuit in the branching units are opposite depending on a direction of the feeding current.

12. A feeding method as claimed in claim 10, wherein said communication cable includes branching units without said at least one switching circuit.

13. A feeding system as claimed in claim 8, wherein the communication cable includes a non-repeater line interval in which no repeater is provided for said non-repeater line interval.

14. A feeding system as claimed in claim 11, wherein said communication cable includes branching units without said at least one switching circuit.

15. A feeding system supplying a current to repeaters from terminal stations, comprising:

a communication cable connected to the repeaters and to the terminal stations conducting the current; and switching circuits, each connected to said communication cable and to a respective repeater, connecting each said respective repeater to one of said communication cable and ground responsive to the current conducted through said communication cable, and each of said switching circuits having a current threshold different from other current thresholds in other switching circuits.

16. A feeding system as claimed in claim 15, wherein each of the terminal stations transmits a switching current greater than said current threshold with increasing current magnitude.

17. A feeding method for supplying a current from terminal stations to repeaters, comprising the steps of:

(a) connecting the repeaters to the terminal stations using a communication cable conducting current;

(b) setting current thresholds in switching circuits different from each other; and (c) connecting a respective repeater to one of the communication cable and ground using a respective switching circuit responsive to the current conducted through the communication cable.

18. A feeding method as claimed in claim 17, further comprising the step of transmitting switching currents greater than the current threshold with increasing current magnitude.

* * * * *

UNITED STATES PATENT AND TRADEMARK OFFICE
CERTIFICATE OF CORRECTION

PATENT NO. : 5,334,879
DATED : August 2, 1994
INVENTOR(S) : Yoshiyuki INOUE

It is certified that error appears in the above-indentified patent and that said Letters Patent is hereby corrected as shown below:

Column 6, Line 34, change "$(K \approx m)m)$" to --$(K \neq m)$--.

Column 8, Line 42, change "113" to --$11_3$--.

Column 11, Line 62, change "$\alpha 1$" to --61--.

Column 11, Line 63, change "$\beta 2$" to --$\alpha 2$--.

Signed and Sealed this

Eleventh Day of October, 1994

Attest:

BRUCE LEHMAN

Attesting Officer

Commissioner of Patents and Trademarks